United States Patent [19]

Shin et al.

[11] Patent Number: 5,557,787
[45] Date of Patent: Sep. 17, 1996

[54] TABLE GENERATING APPARATUS EMPLOYING HEADING, LAYOUT, AND TABLE SCRIPT DATA

[75] Inventors: Kil-Ho Shin; Akira Suzuki, both of Kanagawa, Japan

[73] Assignee: Fuji Xerox Co., Ltd., Tokyo, Japan

[21] Appl. No.: 197,709

[22] Filed: Feb. 17, 1994

[30] Foreign Application Priority Data

Feb. 18, 1993 [JP] Japan .................................. 5-052936
Feb. 18, 1993 [JP] Japan .................................. 5-052937

[51] Int. Cl.$^6$ ........................................................ G06E 17/30
[52] U.S. Cl. .......................... 395/600; 395/149; 395/146; 395/148
[58] Field of Search ...................... 395/600, 145, 395/148, 149, 146; 364/419.1, 419.14

[56] References Cited

U.S. PATENT DOCUMENTS

| | | | |
|---|---|---|---|
| 4,661,904 | 4/1987 | Kurakake et al. | 395/375 |
| 4,903,229 | 2/1990 | Schmidt et al. | 395/600 |
| 5,091,868 | 2/1992 | Pickens et al. | 395/148 |
| 5,241,464 | 8/1993 | Greulich et al. | 364/401 |
| 5,299,305 | 3/1994 | Comae et al. | 395/149 |
| 5,343,387 | 8/1994 | Honma et al. | 364/401 |
| 5,367,619 | 11/1994 | Dipaolo et al. | 345/149 |
| 5,410,646 | 4/1994 | Tondevold et al. | 395/149 |
| 5,450,538 | 9/1995 | Glaser | 395/149 |

FOREIGN PATENT DOCUMENTS 3-37757  2/1991  Japan .

OTHER PUBLICATIONS

Baras et al., "Symphony vs. Framework", *PC Magazine*, v3, Dec. 11, 1984, pp. 296–305.
Christopher Van Buren, "Using Spreadsheets to Print Forms", *A+*, V5, No. 3, Mar. 1987, pp. 80–82.
Harvey P. Macon, "RS/1 Research System", *Byte*, V13, No. 2, Feb., 1988, p. 172.
Tony Pompili, "Borland Readies Forms–Based Tool", *PC Week*, V8, No. 4, Jan., 28, 1991, pp. 1–2.
Heather Clancy, "Borland Intnl. is Introducing an Object–Oriented Development Tool ObjectVision", *Computer Reseller News*, Feb. 11, 1991, p. 2.
Rich Malloy, "Borland Hopes to Make Forms Interesting", *Byte*, v16, No. 5, May, 1991, p. 56.
Vincent Alferi, *The Best Book of WordPerfect 5.1*, Haden Books, (Carmel, Indiana, 1988).
Alan Simpson, *Mastering WordPerfect 5.1 & 5.2 For Windows*, Sybex, (Alemeda, California, 1993), pp. 175–236.
*WordPerfect for Windows Workbook*, WordPerfect Corporation (Orem, Utah, 1991), pp. 145–157, 203–210.
Alan Simpson, *WordPerfect 5.1 for Windows Macro Handbook*, Sybex, Alemeda, California, 1992), pp. 535–641.
Release 2.0 of Improv of Lotus handbook, pp. ii thru 3–21. Lotus Development Corporation, 1991, 1993.

*Primary Examiner*—Thomas G. Black
*Assistant Examiner*—Paul R. Lintz
*Attorney, Agent, or Firm*—Finnegan, Henderson, Farabow, Garrett & Dunner, L.L.P.

[57] ABSTRACT

A logical structure retaining device retains a corresponding relationship between heading information and table data, such as attributes used to search a data base and data obtained by the search. A table form retaining device retains one or plural sets of parameters that determine respective table forms. The parameters can be edited by a table form editing device. A table generating device generates a table by receiving information including the corresponding relationship between the heading information and the table data, referring to the parameters of the table form retaining device, calling, if necessary, a parameter designating device to input parameter values, and generating row heading items, column heading items and data items based on the above information.

6 Claims, 21 Drawing Sheets

```
(A) DEFINITION OF HEADING ITEM GROUPS
      <ENERGY RESOURCE> = {"GAS" "COAL" "OIL" "ELECTRIC
POWER"}
      <FOSSIL FUEL> = {"OIL" "COAL"}
      <CONSUMPTION PLACE> = {"CONSUMPTION IN HOUSEHOLDS"
"CONSUMPTION IN INDUSTRY" "CONSUMPTION IN AGRICULTURE"}
      <YEAR> = {"1982" "1983"}

(B) ATTRIBUTE OF GROUP
      <ENERGY RESOURCE>::<ORDER IN EXPRESSION>:= {2, 4, 1, 3}

(C) RELATIONSHIPS AMONG GROUPS
      ORTHOGONAL RELATION (<ENERGY RESOURCE>, <CONSUMPTION
PLACE>, <YEAR>)
      <ENERGY RESOURCE> ⊃ <FOSSIL FUEL>

(D) CORRESPONDENCES BETWEEN HEADING ITEM STRINGS AND TABLE DATA
      "CONSUMPTION IN HOUSEHOLDS" "OIL" "1982" - "143950"
      "CONSUMPTION IN HOUSEHOLDS" "GAS" "1982" - "4620"
      "CONSUMPTION IN HOUSEHOLDS" "ELECTRIC POWER" "1982" -
"35900"
      "CONSUMPTION IN HOUSEHOLDS" "COAL" "1982" - "3710"
      "CONSUMPTION IN HOUSEHOLDS" "OIL" "1983" - "150520"
      "CONSUMPTION IN HOUSEHOLDS" "GAS" "1983" - "17000"
      "CONSUMPTION IN HOUSEHOLDS" "ELECTRIC POWER" "1983" -
"37630"
      "CONSUMPTION IN HOUSEHOLDS" "COAL" "1983" - "3060"
      "CONSUMPTION IN INDUSTRY" "OIL" "1982" - "44760"
      "CONSUMPTION IN INDUSTRY" "GAS" "1982" - "2876"
      "CONSUMPTION IN INDUSTRY" "ELECTRIC POWER" "1982" -
"56745"
      "CONSUMPTION IN INDUSTRY" "COAL" "1982" - "34513"
      "CONSUMPTION IN INDUSTRY" "OIL" "1983" - "42110"
      "CONSUMPTION IN INDUSTRY" "GAS" "1983" - "3454"
      "CONSUMPTION IN INDUSTRY" "ELECTRIC POWER" "1983" -
"34561"
      "CONSUMPTION IN INDUSTRY" "COAL" "1983" - "23445"
      "CONSUMPTION IN AGRICULTURE" "OIL" "1982" - "3452"
      "CONSUMPTION IN AGRICULTURE" "GAS" "1982" - "3453"
      "CONSUMPTION IN AGRICULTURE" "ELECTRIC POWER" "1982" -
"23430"
      "CONSUMPTION IN AGRICULTURE" "COAL" "1982" - "5460"
      "CONSUMPTION IN AGRICULTURE" "OIL" "1983" - "4456"
      "CONSUMPTION IN AGRICULTURE" "GAS" "1983" - "434566"
      "CONSUMPTION IN AGRICULTURE" "ELECTRIC POWER" "1983" -
"45660"
      "CONSUMPTION IN AGRICULTURE" "COAL" "1983" - "5560"
```

FIG. 3

(A) DEFINITION OF HEADING ITEM GROUPS
       <ENERGY RESOURCE> = {"GAS" "COAL" "OIL" "ELECTRIC POWER"}
       <FOSSIL FUEL> = {"OIL" "COAL"}
       <CONSUMPTION PLACE> = {"CONSUMPTION IN HOUSEHOLDS" "CONSUMPTION IN INDUSTRY" "CONSUMPTION IN AGRICULTURE"}
       <YEAR> = {"1982" "1983"}

(B) ATTRIBUTE OF GROUP
       <ENERGY RESOURCE>::<ORDER IN EXPRESSION>:= {2, 4, 1, 3}

(C) RELATIONSHIPS AMONG GROUPS
       ORTHOGONAL RELATION (<ENERGY RESOURCE>, <CONSUMPTION PLACE>, <YEAR>)
       <ENERGY RESOURCE> ⊃ <FOSSIL FUEL>

(D) CORRESPONDENCES BETWEEN HEADING ITEM STRINGS AND TABLE DATA
       "CONSUMPTION IN HOUSEHOLDS" "OIL" "1982" → "143960"
       "CONSUMPTION IN HOUSEHOLDS" "GAS" "1982" → "4620"
       "CONSUMPTION IN HOUSEHOLDS" "ELECTRIC POWER" "1982" → "35900"
       "CONSUMPTION IN HOUSEHOLDS" "COAL" "1982" → "3710"
       "CONSUMPTION IN HOUSEHOLDS" "OIL" "1983" → "150520"
       "CONSUMPTION IN HOUSEHOLDS" "GAS" "1983" → "17000"
       "CONSUMPTION IN HOUSEHOLDS" "ELECTRIC POWER" "1983" → "37630"
       "CONSUMPTION IN HOUSEHOLDS" "COAL" "1983" → "3060"
       "CONSUMPTION IN INDUSTRY" "OIL" "1982" → "44760"
       "CONSUMPTION IN INDUSTRY" "GAS" "1982" → "2876"
       "CONSUMPTION IN INDUSTRY" "ELECTRIC POWER" "1982" → "56745"
       "CONSUMPTION IN INDUSTRY" "COAL" "1982" → "34513"
       "CONSUMPTION IN INDUSTRY" "OIL" "1983" → "42110"
       "CONSUMPTION IN INDUSTRY" "GAS" "1983" → "3454"
       "CONSUMPTION IN INDUSTRY" "ELECTRIC POWER" "1983" → "34561"
       "CONSUMPTION IN INDUSTRY" "COAL" "1983" → "23445"
       "CONSUMPTION IN AGRICULTURE" "OIL" "1982" → "3452"
       "CONSUMPTION IN AGRICULTURE" "GAS" "1982" → "3453"
       "CONSUMPTION IN AGRICULTURE" "ELECTRIC POWER" "1982" → "23430"
       "CONSUMPTION IN AGRICULTURE" "COAL" "1982" → "5460"
       "CONSUMPTION IN AGRICULTURE" "OIL" "1983" → "4456"
       "CONSUMPTION IN AGRICULTURE" "GAS" "1983" → "434566"
       "CONSUMPTION IN AGRICULTURE" "ELECTRIC POWER" "1983" → "45660"
       "CONSUMPTION IN AGRICULTURE" "COAL" "1983" → "5560"

FIG. 4

DINARY RELATIONS BETWEEN HEADING ITEMS

"CONSUMPTION IN HOUSEHOLDS" → "OIL" "GAS" "ELECTRIC POWER" "COAL" "1982" "1983"

"CONSUMPTION IN INDUSTRY" → "OIL" "GAS" "ELECTRIC POWER" "COAL" "1982" "1983"

"CONSUMPTION IN AGRICULTURE" → "OIL" "GAS" "ELECTRIC POWER" "COAL" "1982" "1983"

"OIL" → "CONSUMPTION IN HOUSEHOLDS" "CONSUMPTION IN INDUSTRY" "CONSUMPTION IN AGRICULTURE" "1982" "1983"

"ELECTRIC POWER" → "CONSUMPTION IN HOUSEHOLDS" "CONSUMPTION IN INDUSTRY" "CONSUMPTION IN AGRICULTURE" "1982" "1983"

"OIL" → "CONSUMPTION IN HOUSEHOLDS" "CONSUMPTION IN INDUSTRY" "CONSUMPTION IN AGRICULTURE" "1982" "1983"

"1982" → "OIL" "GAS" "ELECTRIC POWER" "COAL" "CONSUMPTION IN HOUSEHOLDS" "CONSUMPTION IN INDUSTRY" "CONSUMPTION IN AGRICULTURE"

1983 → "OIL" "GAS" "ELECTRIC POWER" "COAL" "CONSUMPTION IN HOUSEHOLDS" "CONSUMPTION IN INDUSTRY" "CONSUMPTION IN AGRICULTURE"

|   |   |   | A | E |   |
|---|---|---|---|---|---|
|   |   |   | B | F |   |
|   |   |   |   |   |   |
| C | D |   | gnat |  |   |
|   |   |   |   |   |   |

| HEADING ITEM STRING | TABLE DATA |
|---|---|
| A, B, C, D | gnat |
| E, F, C, D | gnat |

FIG. 8

|  |  | 1982 | 1983 |
|---|---|---|---|
| CONSUMPTION IN HOUSEHOLDS | OIL | 143960 | 150520 |
|  | GAS | 4620 | 17000 |
|  | ELECTRIC POWER | 35900 | 37630 |
|  | COAL | 3710 | 3060 |
| CONSUMPTION IN INDUSTRY | OIL | 44760 | 42110 |
|  | GAS | 2876 | 3454 |
|  | ELECTRIC POWER | 56745 | 34561 |
|  | COAL | 34513 | 23445 |
| CONSUMPTION IN AGRICULTURE | OIL | 3452 | 4456 |
|  | GAS | 3453 | 434566 |
|  | ELECTRIC POWER | 23430 | 45660 |
|  | COAL | 5460 | 5560 |

FIG. 9

|  |  | 1982 | 1983 |
|---|---|---|---|
| CONSUMPTION IN HOUSEHOLDS | OIL | 143960 | 150520 |
|  | GAS | 4620 | 17000 |
|  | ELECTRIC POWER | 35900 | 37630 |
|  | COAL | 3710 | 3060 |
|  | SOLAR ENERGY |  |  |
| CONSUMPTION IN INDUSTRY | OIL | 44760 | 42110 |
|  | GAS | 2876 | 3454 |
|  | ELECTRIC POWER | 56745 | 34561 |
|  | COAL | 34513 | 23445 |
|  | SOLAR ENERGY |  |  |
| CONSUMPTION IN AGRICULTURE | OIL | 3452 | 4456 |
|  | GAS | 3453 | 434566 |
|  | ELECTRIC POWER | 23430 | 45660 |
|  | COAL | 5460 | 5560 |
|  | SOLAR ENERGY |  |  |

| - | | OIL | ELECTRIC POWER | COAL |
|---|---|---|---|---|
| CONSUMPTION IN HOUSEHOLDS | 1982 | 143960 | 35900 | 3710 |
| | 1983 | 150520 | 37630 | 3060 |
| CONSUMPTION IN INDUSTRY | 1982 | 44760 | 56745 | 34513 |
| | 1983 | 42110 | 34561 | 23445 |
| CONSUMPTION IN AGRICULTURE | 1982 | 3452 | 23430 | 5460 |
| | 1983 | 4456 | 45660 | 5560 |

| | 1982 | | 1983 | |
|---|---|---|---|---|
| | ELECTRIC POWER | GAS | ELECTRIC POWER | GAS |
| CONSUMPTION IN HOUSEHOLDS | 35900 | 4620 | 37630 | 17000 |
| CONSUMPTION IN INDUSTRY | 56745 | 2876 | 34561 | 3454 |
| CONSUMPTION IN AGRICULTURE | 23430 | 3453 | 45660 | 434566 |

| CLASS | ORDER | NUMBER OF TESTS |
|---|---|---|
| MAMMALS | DOG | 10 |
| MAMMALS | CAT | 18 |
| BIRDS | CROW | 25 |
| BIRDS | PIGEON | 31 |

(B)

| CLASS | ORDER | REACTION | NUMBER |
|---|---|---|---|
| MAMMALS | DOG | POSITIVE | 3 |
| MAMMALS | CAT | POSITIVE | 8 |
| BIRDS | CROW | POSITIVE | 5 |
| BIRDS | PIGEON | POSITIVE | 19 |

(C)

| CLASS | ORDER | REACTION | PERCENTAGE |
|---|---|---|---|
| MAMMALS | DOG | POSITIVE | 30 |
| MAMMALS | CAT | POSITIVE | 44 |
| BIRDS | CROW | POSITIVE | 20 |
| BIRDS | PIGEON | POSITIVE | 61 |

FIG. 14

```
%LABEL 1%
PARAMETER 1 = FORMULA 1
PARAMETER 2 = FORMULA 2
          •
          •
          •
%LABEL 2%
PARAMETER n = FORMULA n
          •
          •
          •
```

FIG. 31

| | NUMBER OF TESTS | POSITIVE | |
| --- | --- | --- | --- |
| | | NUMBER | PERCENTAGE |
| MAMMALS | | | |
| DOG | 10 | 3 | 30 |
| CAT | 18 | 8 | 44 |
| BIRDS | | | |
| CROW | 25 | 5 | 20 |
| PIGEON | 31 | 19 | 61 |

FIG. 32

```
%PREAMBLE%
 COLUMN HEADING =
 ROW HEADING =
 HEIGHT OF COLUMN HEADING SPACE =
 WIDTH OF ROW HEADING SPACE =
 HEIGHT OF PARENT OF COLUMN HEADINGS =
 WIDTH OF PARENT OF ROW HEADINGS =
%SETTING OF COLUMN HEADING REFERENCE POINT%
 REFERENCE POINT = (WIDTH OF ROW HEADING SPACE, 0)
%SIZE OF PARENT OF COLUMN HEADINGS%
 WIDTH OF PARENT = SUM OF WIDTHS OF CHILDREN
 HEIGHT OF PARENT = HEIGHT OF PARENT OF COLUMN HEADINGS
%REFERENCE POINT CHANGE FROM PARENT TO CHILD OF COLUMN HEADINGS%
 REFERENCE POINT = REFERENCE POINT + (0, HEIGHT OF PARENT)
%REFERENCE POINT CHANGE FROM PARENT TO PARENT OF COLUMN HEADINGS%
 REFERENCE POINT = REFERENCE POINT + (WIDTH OF PARENT, 0)
%SIZE OF CHILD OF COLUMN HEADINGS%
 WIDTH OF CHILD =
 HEIGHT OF CHILD = HEIGHT OF COLUMN HEADING SPACE - HEIGHT OF PARENT
%REFERENCE POINT CHANGE FROM CHILD TO SIBLING OF COLUMN HEADINGS%
 REFERENCE POINT = REFERENCE POINT + (WIDTH OF CHILD, 0)
%REFERENCE POINT CHANGE FROM CHILD TO PARENT OF COLUMN HEADINGS%
 REFERENCE POINT = REFERENCE POINT + (0, - HEIGHT OF PARENT)
%SIZE OF ISOLATED COLUMN HEADING%
 WIDTH OF PARENT =
 HEIGHT OF PARENT = HEIGHT OF COLUMN HEADING SPACE
%SETTING OF ROW HEADING REFERENCE POINT%
 REFERENCE POINT = (0, HEIGHT OF COLUMN HEADING SPACE)
%SIZE OF PARENT OF ROW HEADINGS%
 WIDTH OF PARENT = WIDTH OF PARENT OF ROW HEADINGS
 HEIGHT OF PARENT = SUM OF HEIGHTS OF CHILDREN
%REFERENCE POINT CHANGE FROM PARENT TO CHILD OF ROW HEADINGS%
 REFERENCE POINT = REFERENCE POINT + (WIDTH OF PARENT, 0)
%REFERENCE POINT CHANGE FROM PARENT TO PARENT OF ROW HEADINGS%
 REFERENCE POINT = REFERENCE POINT + (0, HEIGHT OF PARENT)
%SIZE OF CHILD OF ROW HEADINGS%
 WIDTH OF CHILD = WIDTH OF ROW HEADING SPACE - WIDTH OF PARENT
 HEIGHT OF CHILD =
%REFERENCE POINT CHANGE FROM CHILD TO SIBLING OF ROW HEADINGS%
 REFERENCE POINT = REFERENCE POINT + (0, HEIGHT OF CHILD)
%REFERENCE POINT CHANGE FROM CHILD TO PARENT OF ROW HEADINGS%
 REFERENCE POINT = REFERENCE POINT + (- WIDTH OF PARENT, 0)
%SIZE OF ISOLATED ROW HEADING%
 WIDTH OF PARENT = WIDTH OF ROW HEADING SPACE
 HEIGHT OF PARENT =
```

FIG. 33

```
%PREAMBLE%
 COLUMN HEADING =
 ROW HEADING =
 HEIGHT OF COLUMN HEADING SPACE =
 WIDTH OF ROW HEADING SPACE =
 HEIGHT OF PARENT OF COLUMN HEADINGS =
 INDENT =
%SETTING OF COLUMN HEADING REFERENCE POINT%
 REFERENCE POINT = (WIDTH OF ROW HEADING SPACE, 0)
%SIZE OF PARENT OF COLUMN HEADINGS%
 WIDTH OF PARENT = SUM OF WIDTHS OF CHILDREN
 HEIGHT OF PARENT = HEIGHT OF PARENT OF COLUMN HEADINGS
%REFERENCE POINT CHANGE FROM PARENT TO CHILD OF COLUMN HEADINGS%
 REFERENCE POINT = REFERENCE POINT + (0, HEIGHT OF PARENT)
%REFERENCE POINT CHANGE FROM PARENT TO PARENT OF COLUMN HEADINGS%
 REFERENCE POINT = REFERENCE POINT + (WIDTH OF PARENT, 0)
%SIZE OF CHILD OF COLUMN HEADINGS%
 WIDTH OF CHILD =
 HEIGHT OF CHILD = HEIGHT OF COLUMN HEADING SPACE - HEIGHT OF PARENT
%REFERENCE POINT CHANGE FROM CHILD TO SIBLING OF COLUMN HEADINGS%
 REFERENCE POINT = REFERENCE POINT + (WIDTH OF CHILD, 0)
%REFERENCE POINT CHANGE FROM CHILD TO PARENT OF COLUMN HEADINGS%
 REFERENCE POINT = REFERENCE POINT + (0, - HEIGHT OF PARENT)
%SIZE OF ISOLATED COLUMN HEADING%
 WIDTH OF PARENT =
 HEIGHT OF PARENT = HEIGHT OF COLUMN HEADING SPACE
%SETTING OF ROW HEADING REFERENCE POINT%
 REFERENCE POINT = (0, HEIGHT OF COLUMN HEADING SPACE)
%SIZE OF PARENT OF ROW HEADINGS%
 WIDTH OF PARENT = WIDTH OF PARENT OF ROW HEADINGS
 HEIGHT OF PARENT =
%REFERENCE POINT CHANGE FROM PARENT TO CHILD OF ROW HEADINGS%
 REFERENCE POINT = REFERENCE POINT + (INDENT, HEIGHT OF PARENT)
%REFERENCE POINT CHANGE FROM PARENT TO PARENT OF ROW HEADINGS%
 REFERENCE POINT = REFERENCE POINT + (0, HEIGHT OF PARENT)
%SIZE OF CHILD OF ROW HEADINGS%
 WIDTH OF CHILD = WIDTH OF ROW HEADING SPACE - INDENT
 HEIGHT OF CHILD =
%REFERENCE POINT CHANGE FROM CHILD TO SIBLING OF ROW HEADINGS%
 REFERENCE POINT = REFERENCE POINT + (0, HEIGHT OF CHILD)
%REFERENCE POINT CHANGE FROM CHILD TO PARENT OF ROW HEADINGS%
 REFERENCE POINT = REFERENCE POINT + (- INDENT, 0)
%SIZE OF ISOLATED ROW HEADING%
 WIDTH OF PARENT = WIDTH OF ROW HEADING SPACE
 HEIGHT OF PARENT =
```

TABLE GENERATING APPARATUS EMPLOYING HEADING, LAYOUT, AND TABLE SCRIPT DATA

BACKGROUND OF THE INVENTION

The present invention relates to a table generating apparatus for generating a table based on heading information and table data.

In recent years, document processing apparatuses such as a DTP (desk top publishing) apparatus and a word processor have been spreading. Since tables are important components of a document, in particular, a technical document, almost all the document processing apparatuses can deal with tables.

FIGS. 2 and 3 show tables in a generalized form. Many of tables appearing in a document consist of heading spaces and data spaces, and items appearing in heading spaces are called heading items. Many of tables appearing in a document express a corresponding relationship between combinations of heading items and data. A combination of heading items is called a heading item string. Table data entered in a data space at a crossing point of a particular row and a particular column corresponds to a heading item string as a combination of heading item strings in those heading item row and column. It may be the case that a plurality of heading items appear in a single row or a single column. For example, in the case of a row and a column indicated by dashed lines in FIG. 2, a heading item string (B, F, b, i), which is a combination of row heading items B and F and column heading items b and i, corresponds to table data "12".

Tables as described above are used to search data corresponding to a heading item string or to recognize a general feature of data corresponding to a heading item string. A table should have a form suitable for its purpose. Therefore, it is desired that even if tables express the same contents, i.e., the same corresponding relationship between heading item strings and table data, they have different forms suitable for their respective purposes.

For example, the table of FIG. 3 is suitable for examining how the data varies when the heading item is fixed to a certain heading item A because data to be found from the heading item A exist in a single sequence. On the other hand, this table is not suitable for examining how the data varies when the heading item is fixed to another heading item B because data to be found from the heading item B appear discretely. If it is expected to examine data with the heading item fixed to B, a table should be generated so that the heading item B exists in a single row or column.

Tables should have different forms depending on sizes and shapes of indication spaces. For example, in the case of a table in which item contents are written horizontally, if indication spaces are narrow, each frame of an item elongates vertically, i.e., there frequently occurs row folding. This type of table is hard to read. In such a case, to provide an easy-to-read table, it is necessary to change the form of the table by, for instance, properly interchanging row headings and column headings to reduce the number of column headings.

Further, the form of a table changes depending on preferences of a person who generates a table. Therefore, for example, when a user attempts to incorporate a table generated by another person into his own document, he naturally would like to alter the form of the table in accordance with his preferences.

As described above, a high-quality document, which is easy to read and reflects preferences of a person who generates a document, can be generated by allowing the same contents, i.e., the same corresponding relationship between heading item strings and table data to be expressed in different forms.

In conventional DTP apparatuses and word processors, a table is generated by a user in the following manner.

1) Determining the shape of a frame (ruled table) composed of ruled lines and the positional relationship between respective items.

2) Determining positions of the ruled lines considering the number of characters of a content of each item and other factors.

3) Actually generating ruled lines in accordance with the shape of the ruled table and the positions of the ruled lines determined above.

4) Inputting item contents to the respective item spaces.

In this table generation method, it is easy to change, after a table is generated, the thickness and kind of a ruled line, the character font of an item, etc. However, to change the shape of the ruled table or the positional relationship between items, a table needs to be re-generated starting from step 1).

In the buried-command type table generating method such as the tabular environment of LaTeX and tbl of roff, a table is generated by describing a text including, in a mixed manner, character strings of item contents and commands for instructing how to draw ruled lines. Absolute positions and lengths of ruled lines and a layout of item contents are automatically calculated by formatting. However, it is the same as in the case of DTP apparatuses and word processors that the shape of the ruled table and the positional relationship between respective items should be determined first.

For example, Japanese Patent Application Unexamined Publication No. Hei. 3-37757 discloses a technique of automatically generating a relatively complex table in which heading items are expressed hierarchically. Even in this technique, it is necessary that a hierarchical relationship of heading items and table data have been set at the time of inputting information. Since the hierarchical relationship has already been set, it is difficult to change the form of a table; that is, it is difficult to generate a new table having a single heading item B from the table of FIG. 3 in which heading items appear discretely.

According to the conventional techniques described above, to change the form of a table relating to the shape of a ruled table and the positional relationship between respective items, a user needs to re-generate a table from the start, which is very cumbersome. Further, it is difficult to reuse an already generated table in a different document or share it by a plurality of users to improve the efficiency of generating a document. This is so because, according to the conventional techniques, there exist strict limitations on the alteration of the form of a table and, therefore, it is difficult to change the form of a table in accordance with preferences of a user or conditions, such as contexts and indication spaces, of the document.

On the other hand, data bases, including a relational data base, are commonly used as an apparatus for searching for data using an item string as a search key. Since search results obtained by using such a data base give a corresponding relationship between an item string and data, in many cases they can be expressed in the form of a table. Even in the prior art, it is possible to automatically convert data base search results to a table having a simple frame of horizontal and vertical lines crossing each other and display it. However, to express search results as a more readable table having a complex shape, it is necessary to generate, on each occasion, a program depending on the data structure of the search results and the shape of a table. To generate a program for automatically generating a table on each occasion, a person who generates it should be in generating a program. Even if he does, an operation of generating a program is a cumbersome work. It is conceivable that he generates a table using a table generating function of a conventional word processor etc. However, since search results by a data base tend to have an enormous amount, the inputting of such search results is also a cumbersome work.

SUMMARY OF THE INVENTION

An object of the present invention is to provide a table generating apparatus which can automatically generate even a table having a complex shape.

According to the invention, a table generating apparatus comprises:

logical structure retaining means for retaining heading information relating to headings of a table and table data representing contents of the table so as to provide correspondences between the heading information and the table data;

table form retaining means for retaining parameters that determine a form of the table; and table generating means for generating the table based on the heading information, the table data and the parameters.

With the above constitution, since a table is generated by using the heading information and the table data retained by the logical structure retaining means, even a complex table form can be generated easily and automatically. Since a table is generated based on the parameters retained by the table form retaining means, the shape, size, etc. of a table can be set arbitrarily by changing the parameters. This enables generation of a table that is suited to conditions of a document or preferences of a user. If logical structure data of a table, such as the heading information and table data, is retained in the form of a file by the logical structure retaining means, a variety of tables can be generated only by changing the parameters of the table form retaining means. This enables tables to be reused and shared by a plurality of users.

The heading information and table data retained by the logical structure retaining means may be such data having a logical structure as attributes used to search a data base and data obtained by the search. In this case, a table can be generated automatically based on search results with a data base.

BRIEF DESCRIPTION OF THE DRAWINGS

FIG. 3 shows an example of a logical structure of a table in the embodiment;

FIG. 4 shows a dinary relation generated from correspondences between heading item strings and table data;

FIG. 8 shows an example of a table;

FIG. 9 shows a table obtained by adding several items to the table of FIG. 8;

FIGS. 13(A)–13(C) show an example of search results with a relational data base as contents of a logical structure retaining means;

FIG. 14 is an example of a table form retained by a table form retaining means;

FIGS. 30 and 31 show examples of tables generated by the table generating apparatus of the embodiment; and FIGS. 32 and 33 show examples of parameters retained by the table form retaining means.

DESCRIPTION OF THE PREFERRED EMBODIMENTS

Figure 1:
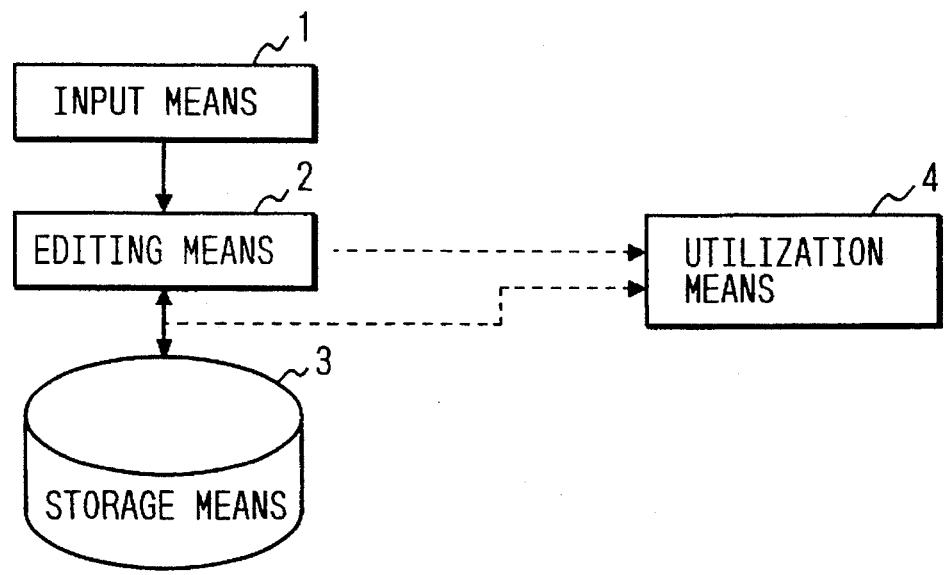
FIG. 1 is a block diagram of a table generating apparatus according to an embodiment of the present invention.

FIG. 1 is a block diagram showing a table generating apparatus according to an embodiment of the present invention. In FIG. 1, reference numeral 1 denotes an input means; 2, an editing means; 3, a storage means; and 4, a utilization means. The input means 1 supplies the editing means 2 with input data such as table data and input heading information which can serve as heading information of a table. The input data may be generated with a work station, an input device such as a keyboard, etc., or may be input via a communication line. Further, the input data may be read from a disk or memory. The input data may be in the form of heading information and table data or in other forms. Edit instruction data is also input to the apparatus and sent to the editing means 2.

The editing means 2 receives the input data etc. sent from the input means 1 and, when necessary, converts it to data having a form suitable for storage into the storage means 3. Further, the edition means 2 edits the already stored heading information and table data and stores an edited result to the storage means 3. Editing operations include logical editing operations such as addition, modification or deletion of the heading information or table data, modification of the heading information or table data stored in the storage means 3, and merging of several tables.

The storage means 3 stores the heading information and table data, i.e., retains structured table information.

The utilization means 4 can be any kind of processing means which performs processing by use of the heading information and table data stored in the storage means 3 or the data edited by the editing means 2. For example, it may be a means for actually generating a table based on the heading information and table data, in which case a layout can be generated automatically using the input heading information and table data and designating proper parameters. Completely automatic generation of a layout can even be possible by preparing in advance the parameters to be designated by use of a proper means.

Figure 2:
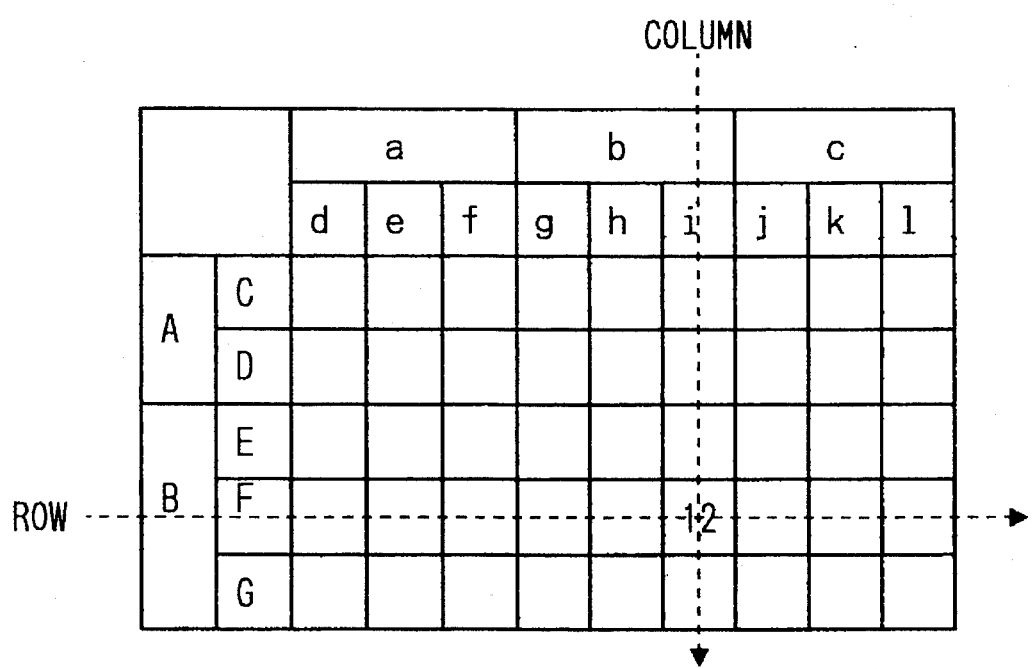
FIG. 2 generally shows a table.

A description will be made of the heading information and table data to be stored in the storage means 3. FIG. 2 shows a table in a generalized form. A table consists of heading spaces and data spaces. An item appearing in the heading space is called a heading item. Many of tables appearing in a document express a corresponding relationship between combinations of heading items and data. A combination of heading items is called a heading item string. Table data entered in a data space at a crossing point of a particular row and a particular column corresponds to a heading item string as a combination of heading item strings in those heading item row and column. It may be the case that a plurality of heading items appear in a single row or a single column. For example, in the case of a row and a column indicated by dashed lines in FIG. 2, a heading item string (B, F, b, i), which is a combination of row heading items B and F and column heading items b and i, corresponds to table data "12."

FIG. 3 is an example of a logical structure of a table. In storing the logical structure of a table, it is necessary that the heading information include at least heading item strings and correspondences between heading item strings and table data as mentioned above be stored. Part (D) of FIG. 3 shows an example of correspondences between heading item strings and table data. The left side of "→" is a heading item string and its right side is corresponding data. For example, a heading item string consisting of heading items "consumption in households", "oil" and "1982" is correlated with table data "143950".

One or a plurality of heading items can constitute a group, which is regarded as a higher rank heading item of heading items belonging thereto and does not appear in any heading space of a table. This grouping gives a hierarchical relationship to heading items. In correspondences between heading item strings and table data shown in part (D) of FIG. 3, each of heading items constituting a heading item string can be a member of a group. Part (A) of FIG. 3 shows an example of definition of heading item groups. For example, a group <energy resource> consists of four members of heading items "gas", "coal", "oil" and "electric power". That is, the four heading items are hierarchically correlated with the group <energy resource>, which is a higher rank heading item. The same relationship holds for the other groups <fossil fuel>, <consumption place> and <year>. Among definable groups are a group necessary for logical editing and a group necessary for layout such as a collection of heading items to be placed in row heading spaces and column heading spaces. Groups can be defined as many as required. Naturally a group name can be designated as a member.

Each group consisting of heading items can be given an attribute, which is stored as heading information such that it can be recognized to which group it is given. For example, group names <energy resource>, <fossil fuel>, <consumption place> and <year> given to the groups shown in part (A) of FIG. 3 are held as an attribute in an expression. In defining an order for heading items of a group, the order of appearance of the heading items may be employed if there is only one order of appearance. However, if it is intended to define a plurality of orders, those orders can be defined as attributes. For example, as shown in part (C) of FIG. 3, if it is intended to arrange the four heading items "gas", "coal", "oil" and "electric power" belonging to the group <energy resource> in the order 2, 4, 1, 3, this order is defined. In part (B) of FIG. 3, numerals in the right side of <order in expression> represent positions of respective heading items as appear in a definition of a group, where magnitudes of numerals indicate the positions of the respective heading items in the definition of the group. To refer to an order thus defined, a name can be given to the order itself, in which case the name is stored also as an attribute.

A relationship among described groups and heading items can also be described. More specifically, a relationship can be described among groups, among groups and heading items and among heading items. For example, between two groups, there can be described an inclusion relation in which one group is included by the other group, and a relationship in which one depends on the other. A relationship that the group <energy resource> includes the group <fossil fuel> can be described as shown in the second line of part (C) of FIG. 3. A relationship in which a group depends on a heading item can be described. For example, it can be specified that a group "Artiodactyla order" consisting of "cow", "sheep" and "pig" depends on a heading item "mammals".

An orthogonal relationship can be defined among a plurality of groups. The orthogonality is a relationship in which when one element is taken from each of groups concerned, at least one heading item string including all those elements can be found in correspondences between heading item strings and table data. For example, a relationship shown in the first line of part (C) of FIG. 3 defines that the three groups <energy resource>, <consumption place> and <year> are orthogonal. More specifically, heading items belonging to the respective groups <energy resource>, <consumption place> and <year> appear in heading item strings shown in part (D) of FIG. 3. For example, when the heading items "gas", "consumption in households" and "1982" are taken from the groups <energy resource>, <consumption place> and <year>, respectively, there exists a heading item string including all those heading items and table data "4620" corresponds to this heading item string. Thus, orthogonality is satisfied.

A dinary relation can be established between heading items. The dinary relation between heading items means the following relationship. Assume here that "heading 1" and "heading 2" are different heading items. If there exists a correspondence from a heading item string including "heading 1" and "heading 2" to data, it is said that a dinary relation holds between "heading 1" and "heading 2". A local relationship between heading items can be described using information of a dinary relation. In the example of the first line of part (D) of FIG. 3, since the heading item string ("consumption in households" "oil" "1982") corresponds to the table data "143960", dinary relations hold between "consumption in households" and "oil", between "oil" and "1982" and between "1982" and "consumption in households". FIG. 4 shows dinary relations generated from the correspondences between the heading item strings and table data shown in part (D) of FIG. 3. In FIG. 4, a right side of mark "→" is a list of heading items that is dinary relation with a left side thereof. This type of information on a dinary relation can be used in examining whether there exists a correspondence between a heading item string including two particular heading items and table data. If information on dinary relations is not available, it is necessary to search all the descriptions of heading item strings and table data. On the other hand, if it is available, it suffices to examine that information. Therefore, related heading items can be searched for at high speed, which improves efficiency of processing.

As described above, a table can be described by heading information and table data, which include correspondences between heading item strings and table data, definitions of groups of heading items, attributes of groups and relationships among groups. For example, a table shown in FIG. 8 can be described by the information shown in FIGS. 3 and 4. The table data entered in the data spaces of FIG. 8 are correlated with the heading item strings as shown in part (D) of FIG. 3. The heading items are classified into the groups of the consumption place, energy resource and year. The order of appearance in expression of the heading items belonging to the group <energy resource> is defined as information of the attribute of that group. That is, the order of appearance of the heading items is defined so that "oil", "gas", "electric power" and "coal" correspond to 1, 2, 3 and 4, respectively. It is described as an intergroup relationship that the three groups <energy resource>, <consumption place> and <year> are orthogonal. When necessary, the information on dinary relations is generated as shown in FIG. 4.

In other words, according to the invention, by describing a table in the form of the above-described heading information and table data, the table-describing information can be obtained completely independently of a layout. Therefore, results of a logical editing operation are incorporated in a table description in the form of minimum necessary alterations. Layout alterations caused by logical editing operations can be effected en bloc rather than on each occasion of an editing operation, which improves efficiency of processing.

Several editing operations will be described below. Addition of a heading item is very simple. That is, a new heading item can be added only by adding it to a corresponding heading item group. To add an energy resource "solar energy" to the example of FIG. 3, it is sufficient to change the definition of the group <energy resource> (see part (A) of FIG. 3) to, for instance, <energy resource>:={"gas" "coal" "oil" "electric power" "solar energy"} where the heading item "solar energy" is simply added. It is also necessary to change the attribute of this group (see part (B) of FIG. 3) in accordance with the increase of the members of the group <energy resource>. This change may be performed by a user, or may be performed automatically by the editing means 2 shown in FIG. 1. A new attribute should be <energy resource>::<order in expression>:={2, 4, 1, 3, 5}.

A consideration will be made of a case where an orthogonal relationship is defined between groups including the group to which the heading item has been added in the above manner. Referring to the table logical structure stored in the storage means 3, the utilization means 4 displays a ruled frame and also displays heading items and data in item spaces of the frame. When the new heading item "solar energy" is added to the group <energy resource> as in the above example, the intergroup relationship shown in part (C) of FIG. 3 is referred to, so that it is judged that the groups <energy resource>, <consumption place> and <year> are orthogonal. That is, it is recognized that a combination of the heading item "solar energy" and heading items belonging to the groups <year> and <consumption place> necessarily corresponds to data. Therefore, in the table of FIG. 9, for instance, a table shown in FIG. 9 can be generated by modifying the shape of the ruled frame such that a new row is automatically inserted on the right side of the heading space of each of the heading items "consumption in households", "consumption in industry" and "consumption in agriculture" belonging to the group <consumption place> to provide item spaces for all the combinations of "solar energy" and the heading items belonging to <year> and <consumption place>. In this manner, even when a new heading item is added to any of a plurality of orthogonal groups, it is possible to automatically insert necessary rows or columns at proper positions while referring to a description of an orthogonal relationship among intergroup relationships.

Further, it may be the case that an inclusion relation is defined as an intergroup relationship as in the case of part (C) of FIG. 3. In this case, addition of a new heading item to an included group can be automatically reflected in an including group. Take as an example the case shown in part (A) of FIG. 3, in which the group <fossil fuel> consists of "oil" and "coal". If it is described in the expression that the group <fossil fuel> is included by the group <energy resource>, a new heading item "natural gas", for instance, can be automatically included in the group <energy resource> when it is added to the group <fossil fuel>.

For example, the following two methods are conceivable as methods of specifying the inclusion relation. According to the first method, all the heading items (elements) of the groups <fossil fuel> and <energy resource> are listed as members, as shown in part (A) of FIG. 3. More specifically, the groups are defined as <energy resource>={"oil" "gas" "electric power" "coal"}

<fossil fuel>={"oil" "coal"}, and the intergroup relationship is defined as

<fossil fuel>⊂<energy resource> as shown in part (C) of FIG. 3. When the heading item "natural gas" is added to the group <fossil fuel>, it is automatically added to the group <energy resource> while the descriptions defining the groups and the intergroup relationship are referred to.

According to the second method, all the heading items (elements) of the group <fossil fuel> are described, and the group <energy resource> is defined as <energy resource>={"gas" "solar energy" <fossil fuel>}.

In this case, in referring to the heading items belonging to the group <energy resource>, the definition of the group <fossil fuel> is further referred to. In this method, the description of <energy resource> need not be rewritten even when the heading item "natural gas" is added to the group <fossil fuel>.

Figures 10, 11, 12:
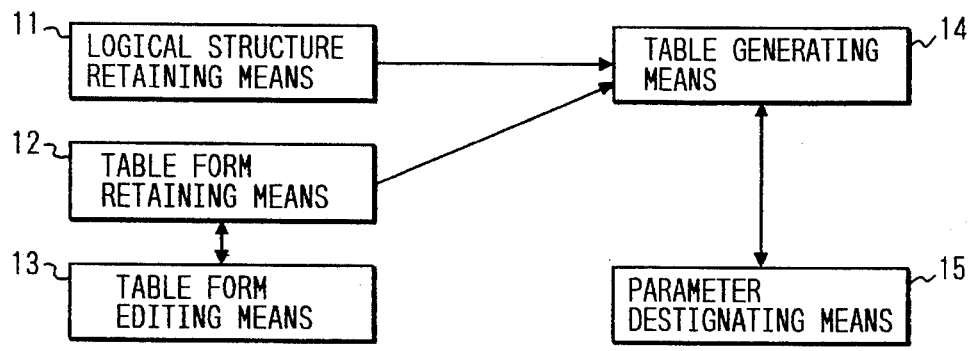
FIGS. 10 and 11 show two tables to merge with each other.
FIG. 12 is a block diagram showing a table generating apparatus according to another embodiment of the invention.

Next, a consideration will be made of merging of a plurality of tables. For example, in the case of merging first and second tables, a list of correspondences between heading item strings and table data described in an expression of the first table and a list of correspondences between heading item strings and table data described in an expression of the second table are combined with each other. A resulting new list is a list of correspondences between heading item strings and table data of a merged table. If the same correspondence from a heading item string to data is described in both expressions of the original tables, redundancy is avoided in the expression of the merged table. A difference of orders of appearance of heading items in the respective heading item strings is disregarded. For example, to merge tables shown in FIGS. 10 and 11, lists of correspondences between heading item strings and table data of the respective tables are combined with each other, and redundancy of data relating to "electric power" is avoided, to thereby generate a list as shown in part (D) of FIG. 3. In this case, if dinary relations are established as shown in FIG. 4, these data can be modified automatically. Although it is necessary to modify group definitions, such modification can also be performed automatically. Assume here that "oil", "electric power" and "coal" of the table of FIG. 10 are members of the group <energy resource> and "electric power" and "gas"

of the table of FIG. 11 are members of the group <energy resource>. By combining these members and avoiding redundancy in response to a merge instruction, four elements of "gas", "coal", "oil" and "electric power" can be made members of the group <energy resource> as shown in part (A) of FIG. 3. In this manner, merging is performed by a logical editing operation, a new table is generated. For example, the table as shown in FIG. 8 can be obtained easily by merging the tables of FIGS. 10 and 11. The above-described merging operation can be performed by the editing means 2 or utilization means 4 shown in FIG. 1. The merging operation can be performed automatically even by the utilization means 4 by using a general-purpose program.

Other various editing operations can also be performed which include table separation, generation of a partial table, editing with respect to the entire table, and addition, deletion and modification of such data as a correspondence between heading item strings and table data, a definition of a heading item group, a group attribute and an intergroup relationship.

Figures 5, 6, 7:
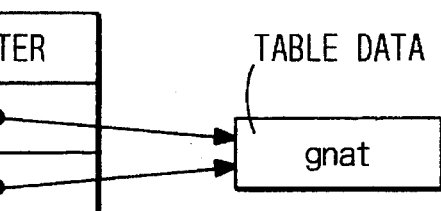
FIG. 5 shows a table of another form.
FIG. 6 shows part of a logical structure corresponding to the table of FIG. 5 in the embodiment.
FIG. 7 shows part of a logical structure of a table having common table data.

FIG. 5 shows an example of another type of table. In some cases, it is necessary for a user to allocate common table data to a plurality of heading item strings. For example, the table of FIG. 5 has a merged item space, i.e., data space. In this example, a heading item string consisting of "A", "B", "C" and "D" and a heading item string consisting of "E", "F", "C" and "G" have a common table data "gnat". According to conventional table generating methods, when the same data is placed in adjacent item spaces in a table layout, those heading items are merged; that is, no ruled line as a boundary is drawn to provide a single item space encompassing a plurality of rows or columns.

However, in the above embodiment, in which heading item strings and table data are in one-to-one correspondence to each other as shown in part (D) of FIG. 3, it is difficult to generate a table having a common relation as in the case of the table of FIG. 5. FIG. 6 shows an example of a logical structure corresponding to the table of FIG. 5 according to the above embodiment. As shown in FIG. 6, each of the heading item strings "A", "B", "C", "D" and "E", "F", "C", "D" has the table data "gnat". Since the two same table data "gnat" are held as different data, they cannot be recognized as common data. The apparatus could be constructed so as to be able to merge item spaces having the same data, but in that case two item spaces accidentally having the same data are also merged, resulting in generation of an unintended table.

FIG. 7 shows an example of a logical structure of a table to enable merging of item spaces having common table data. As shown in FIG. 7, pointers are provided, as heading information, to indicate table data from respective heading item strings. That is, the pointer represents a correspondence between each heading item string and table data. Therefore, as shown in FIG. 7, common table data is indicated by pointers from a plurality of heading item strings. By comparing values of pointers, it is possible to recognize whether they indicate the same table data, i.e., common table data, and to merge a plurality of item spaces sharing certain table data into a single item space. This enables generation of a table having a merged item space as exemplified by the table of FIG. 5. Even if adjacent item spaces accidentally have the same data, they can be regarded as different ones because their pointers have different values.

When common table data is changed, this editing result automatically influences a plurality of heading item strings sharing the common table data and corresponding table data are changed.

As described above, by providing heading item strings and pointers as the heading information, the sharing of table data is realized to thereby enable generation of a table having a merged item space (data space). It goes without saying that the heading information may include other information such as the hierarchical structure, interrelationship and attribute (see FIG. 3) and the dinary relation (see FIG. 4).

As described above, according to the above embodiments, the expression of a table stored in the storage means has the logical structure represented by the heading information and table data and is completely independent of a table layout. Therefore, there can be provided a powerful logical editing function. Since it is not necessary to have a layout reflect editing results on each occasion, the efficiency of processing can be improved. Further, a sophisticated layout can be automatically generated by using such table expression.

Figure 15:
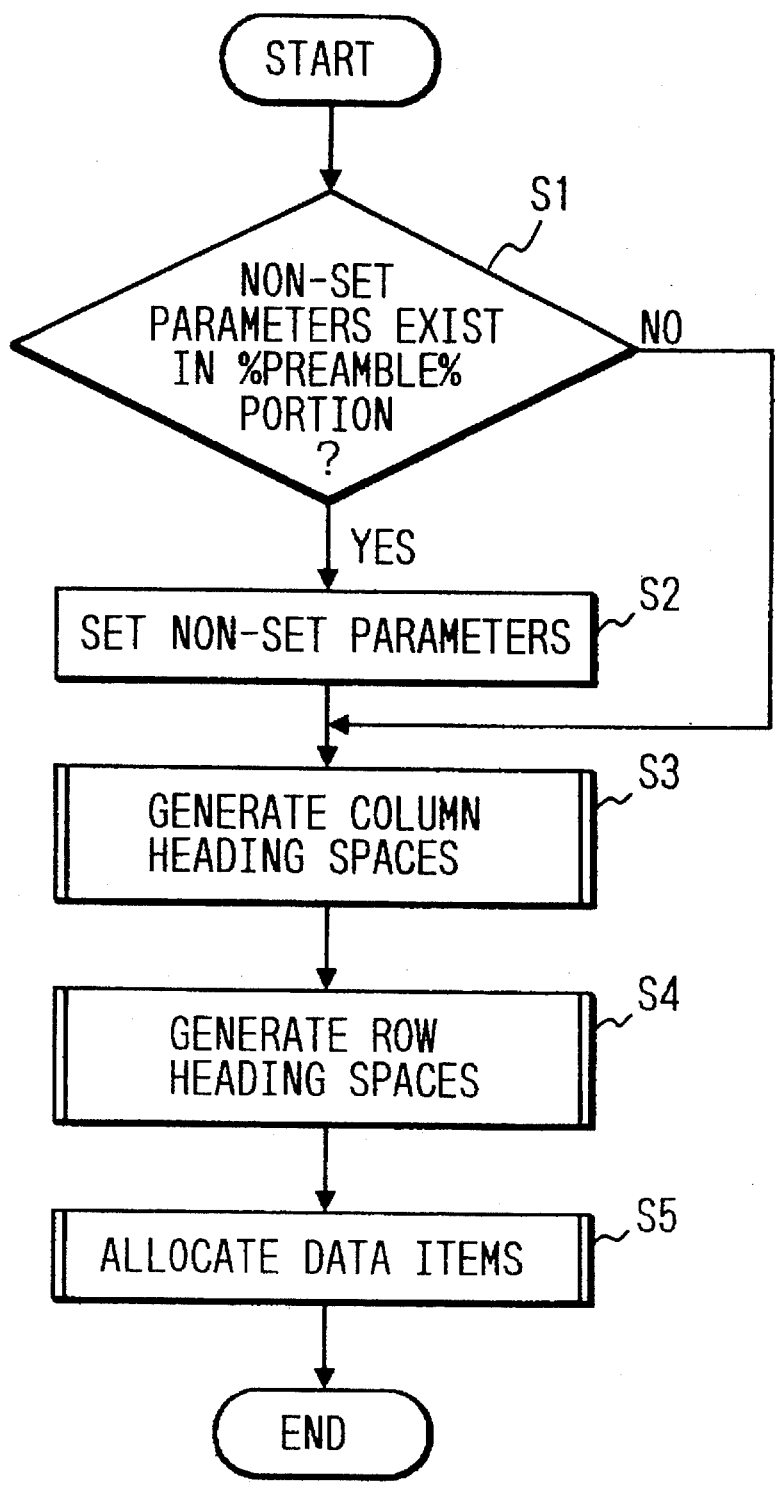
FIGS. 15–20 are flowcharts showing the operation of a table generating means of the table generating apparatus according to the embodiment.

The table generating apparatus of FIG. 1 can operate according to a flowchart of FIG. 15.

FIG. 12 is a block diagram showing a table generating apparatus according to another embodiment of the invention. In FIG. 12, reference numeral 11 denotes a logical structure retaining means; 12, a table form retaining means; 13, a table form editing means; 14, a table generating means; and 15, a parameter designating means.

The logical structure retaining means 11 retains table-related information in which heading information relating to headings of a table and table data representing table contents are correlated with each other. The table-related information may be input by a user or may be information that has been processed based on input information. The table-related information may also be extracted from an existing table with a certain means. Further, it may be search results with a data base. The table-related information thus obtained may be stored in a storage medium attached to the logical structure retaining means 11. Alternatively, the apparatus may be constructed such that the table-related information itself is stored, as a file or the like, in an external storage medium and the logical structure retaining means 11 has a pointer to that file, in which construction contents of the file are read through the pointer.

The table form retaining means 12 retains one or plural sets of rules and parameters that determine table forms. Each table form thus retained involves one or a plurality of parameters, and a value of each parameter may be set already or left undetermined. Where the parameter value has not been set yet, a predetermined value is used, a parameter is generated according to a rule, or a corresponding value is designated by the parameter designating means 15. The parameters may be stored in a storage medium attached to the table form retaining means 12. Alternatively, the apparatus may be constructed such that the parameters themselves are stored, as a file or the like, in an external storage medium and the table form retaining means 12 has a pointer to that file, in which construction contents of the file are read through the pointer.

The table form editing means 13 serves changes parameters of a table form retained by the table form retaining means 12, to edit the table form. A user can edit an existing table form through the table form editing means 13 into a table form that matches his preferences or a purpose of the table. He can naturally generate or register a new table form. In doing so, he may refrain from setting part of parameters, which will be designated by the parameter designating means 15 when a table is generated. Where there is no need of editing a table form, the table form editing means 13 can be omitted.

The table generating means 14 receives the table-related information such as the corresponding relationship between the heading information and the table data from the logical structure retaining means 11, and generates a table while referring to necessary parameters retained by the table form retaining means 12. The table generating means 14 selectively refers to one of a plurality of table forms retained by the table form retaining means 12. Therefore, the form of a table to be generated can be changed by switching the table form of the table form retaining means 12 referred to by the table generating means 14. The selection of the table form may be performed by a user, or automatically read from a file or the like. The apparatus can be constructed such that a predetermined form is selected in the absence of an instruction for selection.

Where there exists a parameter whose value has not been set yet when the table form retaining means 12 is referred to, the parameter designating means 15 is further called to obtain a value corresponding to that parameter. A single parameter may be referred to at plural times. When a parameter whose value has not been set yet is referred to at plural times, difference values may be designated by the parameter designating means 15 on respective occasions. Naturally the single value once input may be used on every occasion. Further, a parameter whose value has not ben set yet may be automatically given a predetermined value, or a value calculated from another parameter. By modifying, in various manners, undetermined parameter values in a table form, a variety of table forms can further be obtained within the limit of an outline that is determined by parameters already set. If necessary, a table form thus generated can be used as an input of another type of document editing apparatus by performing data conversion.

One table form is determined when necessary by designation of all the parameters. Based on the table form thus determined, the table generating means 14 generates a table by allocating the table-related information of the logical structure retaining means 11. The generated table consists of ruled lines and item contents. The ruled lines do not necessarily have a simple form of horizontal and vertical lines crossing each other. It is permitted that either of adjacent heading item spaces and adjacent table data spaces (rectangular areas) can encompass a plurality of rows or columns. A generated table can be displayed on a sheet or a screen by a display means, or stored as a file on a storage medium.

The parameter designating means 15 designates a value corresponding to a parameter of the table form retaining means 12 when it has not been set yet. The designated value may be written to the table form retaining means 12, or retained by the table generating means 14 or parameter designating means 15. In the latter case, even after a table is generated for a certain table form, parameters whose values have not been set remain as they are. Therefore, the table form is retained as it is, and can be used to generate another table. That is, a table form retained by the table form retaining means 12 can be used as a template. For example, the parameter retaining means 15 consists of a keyboard and a display, in which case a user can input values in accordance with instructions indicated on the display. Alternatively, parameter values may be automatically read from a file or the like. Where it is known that table forms of the table form retaining means 12 do not have any parameter whose value has not been set, the parameter designating means 15 can be omitted.

The table generating apparatus of the invention is intended to satisfy both of high layout processability and high editing processability in automatically generating a table. In general, if the data structure for generating a table is suited to one of the layout processing and the editing processing, a vast processing amount is necessary for the other or the apparatus cannot perform the other processing. In the table generating apparatus of the invention, the table data structure itself is suited to the editing processing and high layout processability is secured by enabling automatic generation of parameters for the layout processing from the table data structure.

More specifically, the logical structure retaining means 11 retains the corresponding relationship between the heading information and the table data. For example, the logical structure retaining means 11 can retain search results with a relational data base. FIGS. 13(A)–13(C) show an example of contents, i.e., search results with a relational data base, of the logical structure retaining means 11. As shown in FIGS. 13(A)–13(C), search results with a relational data base have a table form, and headings of "class", "order", "number of tests", "reaction", "number" and "percentage" are called attributes. Data lists appearing under an attribute list represent search results, and a data set of one row, for instance, <mammals dog 10>, is called a tuple. A relational data base accumulates and manages tuples as data, in which each tuple is searched for by using an attribute list as a search key. Further, for example, "mammals" and "birds" are called data searched for from an attribute "class", and "dog", "cat", "crow" and "pigeon" are called data searched for from an attribute "order". Other items "positive" and numerals are also called data.

In the following description, each tuple is regarded as a correspondence between heading information and table data, i.e., as table-related information. In FIGS. 13(A)–13(C), the rightmost item of a tuple is table data, and the remaining items of the tuple and an attribute of the table data constitute a heading item string, i.e., heading information. For example, in a tuple <mammals dog 10>, "10" is table data, and "mammals" and "dog" and an attribute "number of tests" of the table data constitutes heading item string. And the following correspondence between the heading information and the table data is obtained:

{mammals dog number of tests}→10

This heading item string is information which can be headings of a generated table. It can be determined by an instruction from a user from what attributes data to actually become table data should be searched for.

In addition to information of a correspondence between a heading item string and table data, information of a group constituted of one or a plurality of elements of a heading item string can be heading information. Further, an attribute is given to each group. For example, a group can be constituted of elements "mammals" and "birds", and can be given an attribute "class" An order of elements of a group can also be an attribute of the group. Further, a relationship among groups or elements of a group can be described. More specifically, a relationship can be described among groups, among groups and elements and among elements. For example, between two groups, there can be described an inclusion relation in which one group is included by the other group, and a relationship in which one depends on the other. An orthogonal relationship can be defined among a plurality of groups. The orthogonality is a relationship in which when one element is taken from each of groups concerned, at least one heading item string including all those elements can be found in correspondences between heading item strings and table data. For example, in the tables of FIGS. 13(A)–13(C), the higher rank group "class" and the group "order" including the elements "dog", "cat", "crow" and "pigeon" are orthogonal.

FIG. 14 shows an example of a table form retained by the table form retaining means 12. As shown in FIG. 14, the table form retaining means 12 retains parameters in the form of a list of parameters and labels. A parameter is constituted such that a parameter name is placed on the left side of "=" and a formula is placed on the right side. For example, in the case of a parameter having a parameter name "parameter 1" and a formula "formula 1", it is described as "parameter 1=formula 1". A label is described by a label name interposed between two "%"s, such as "%label 1%" or "%label 2%". The label serves to deal with several related parameters together. For example, in FIG. 14, "%label 1%" is a name provided for parameter 1=formula 1 parameter 2=formula 2.

The above description is called a %label 1% portion.

Figure 29:
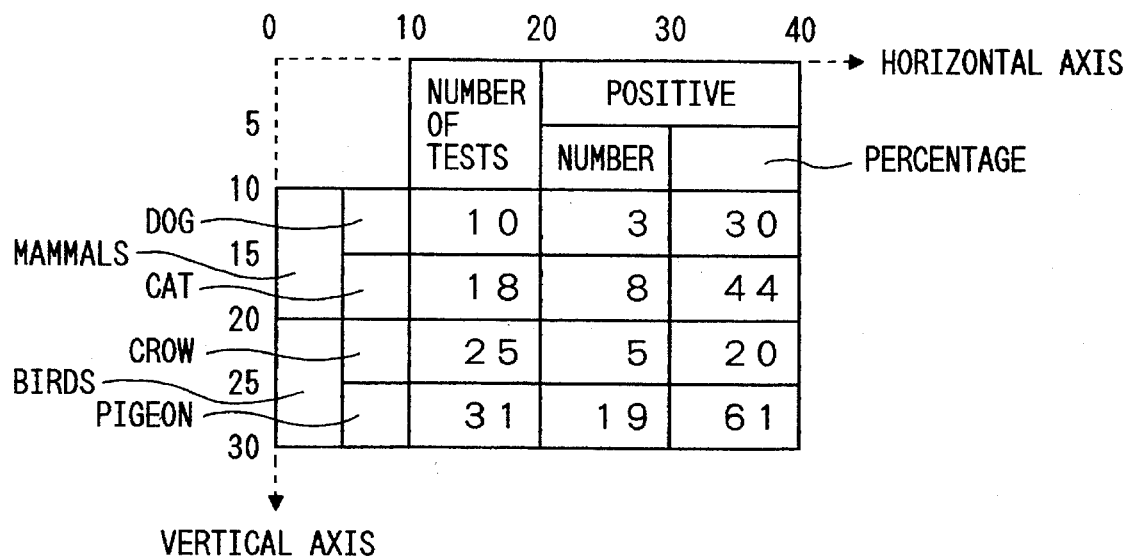
Figure 30:
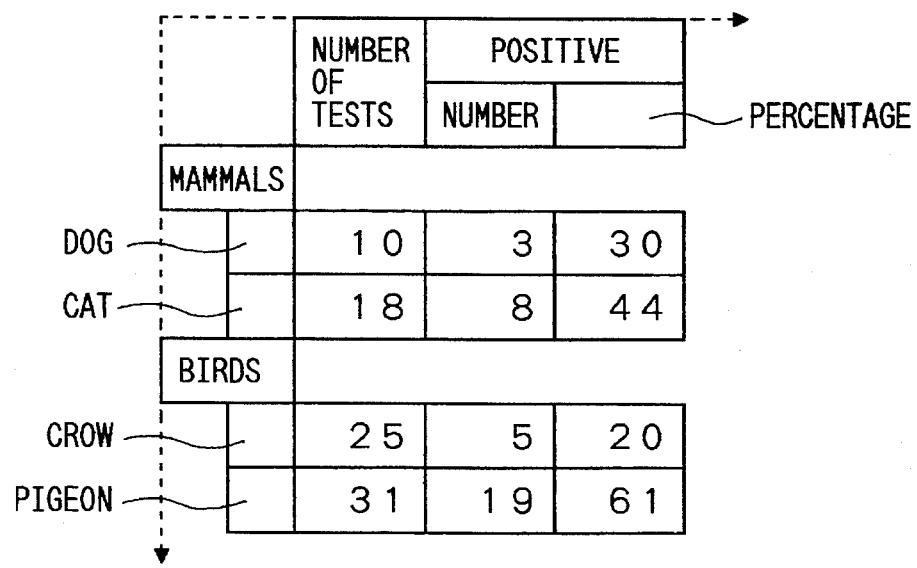

FIGS. 29–31 are examples of generated tables, and FIGS. 32 and 33 are examples of parameters and parameter generation rules retained by the table form retaining means 12. For example, in the case of a standard table form of FIG. 29, items as shown in FIG. 32 can be set as labels and parameters. The table form retaining means 12 retains such parameters. In the case of a parameter having no formula, a formula is designated, for instance, by the parameter designating means 15.

For example, after the data structure shown in FIG. 3 has been prepared, the table as shown in FIG. 8 can be described in the form of the data structure (heading information and table data) shown in FIG. 3. The table generating means 14 generates an actual table based on the heading information and the table data. The table generating means 14 can automatically allocate row headings and column headings and insert table data by using the structured information describing a table, though in some cases the table generating means 14 needs to receive several instructions from a user as to, for instance, what heading items should be used to generate the table. As a result, the table as shown in FIG. 8 is obtained.

A variety of table forms can be realized by changing formulae of parameters or parameters used. For example, an indent type table of FIG. 30, in which parent headings are projected rightward from child headings, can be generated by setting parameters as shown in FIG. 33 by changing several parameter formulae and several parameters used. Further, a cut-in head type table as shown in FIG. 31 can also be generated, in which some parent headings encompass the entire row width. The table form retaining means 12 can retain plural sets of parameters in accordance with various table forms.

As described above, to switch the table form, a selection means selects from among a plurality of table forms retained by the table form retaining means 12. Where the table retaining means 12 is constructed so as to read a table form file that is associated with a data base search file, such a table form file may be replaced. Where the apparatus has the table form editing means 13, table form parameters of the table form retaining means 12 may be rewritten with the table form editing means 13.

The table generating means 14 receives, for instance, table-related information such as a correspondence between a heading item string and table data from the logical structure retaining means 11, and generates a table while referring to parameters of the table form retaining means 12. The table generating means 14 generates a table step-by-step in the order of column heading spaces, row heading spaces and data item spaces. The table generating means 14 can be so constructed as to generate row heading spaces first.

A procedure of generating each space starts with determination of values of part of the parameters of a table form that are required for the generation of that portion. Necessary parameters can be identified by a label. Where a necessary formula is not described or a formula has an undescribed portion, a value for the undescribed formula or portion is input with the parameter designating means 15. When parameter values are designated by reference to a table form or with the parameter designating means 15, they are retained as variables of the table generating means 14 having the same names as the parameters. After determining the values of the necessary parameters, the table generating means 14 generates the corresponding portion of the table in accordance with the determined values.

Row headings and column headings are designated such that a user allocates, for instance, attributes that were used in searching a data base to those headings with the table form retaining means 13 or parameter designating means 15. This is done by designating parameters "row heading" and "column heading" in a table form. When these parameters have no designated values, a user is prompted, through the parameter designating means 15, to set those values.

Generated row heading items and column heading items are not necessarily arranged in a single line. To avoid making the following description unduly complex, it is assumed here that there does not exists a hierarchy of three or more levels. However, actual tables can have a hierarchy of three or more levels. Among heading items constituting a hierarchy, higher rank items are called parent heading items and lower rank items are called child heading items. A solely allocated heading item is called an isolated heading item. The table generating means 14 automatically judges whether a heading item is an isolated heading item, a parent heading item or a child heading item. A parent heading item and child heading items depending thereon need to be allocated together. The width and height of an item space, which are necessary to allocate a heading item, are determined by referring to parameters of the table form retaining means 12.

Where a formula itself is not described or it has an undescribed portion when the table generating means 14 determines a value of a formula of a table form parameter retained by the table form retaining means 12, the parameter designating means 15 prompts a user to input that value. For example, if there exists "reference point=(, 10)" in the parameters, in which no coordinate value is designated before the comma, a message "reference point=(_, 10), for instance, is displayed on a display device of the parameter designating means 15 to prompt a user. A symbol "_" means a cursor. If the user inputs "5" with a keyboard of the parameter designating means 15, the reference point is set as (5, 10). The input values are sent to the table generating means 14.

FIGS. 15–20 are flowcharts showing an example of the operation of the table generating means 14 according to the embodiment of the invention. The flowchart will be described below step by step. FIG. 15 is a main routine.

Step S1: A %preamble% portion in the information of a selected table form of the table form retaining means 12 is referred to, and it is judged whether there exist non-set parameters in that portion. If the judgment is affirmative, the process goes to step S2. If the judgment is negative, the process goes to step S3.

Step S2: Since it has been judged that there exist non-set parameters, values of the non-set parameters are obtained by calling the parameter designating means 15, and are set as values of variables of the table generating means 14 having the same names as the parameters.

Step S3: Ruled lines are drawn in row column heading spaces, and column heading items are allocated thereto. This process is performed by executing a procedure P100 shown in FIG. 16.

Step S4: Ruled lines are drawn in row heading spaces, and row heading items are allocated thereto. This process is similar to the above process for column heading items, and in those algorithms columns and rows are simply replaced with each other. A detailed flowchart is omitted.

Step S5: Data items are allocated to proper positions. More specifically, positions and sizes of item spaces in which to write data are calculated while the information of the corresponding relationship between the heading item strings and data retained by the logical structure retaining means 11 are referred to, rules lines are drawn around the item spaces, and data item contents are allocated to those spaces. In the case of irregular tables, a data item space may encompass a plurality of rows or columns. The allocation of the data items completes the table generation.

Figure 16:
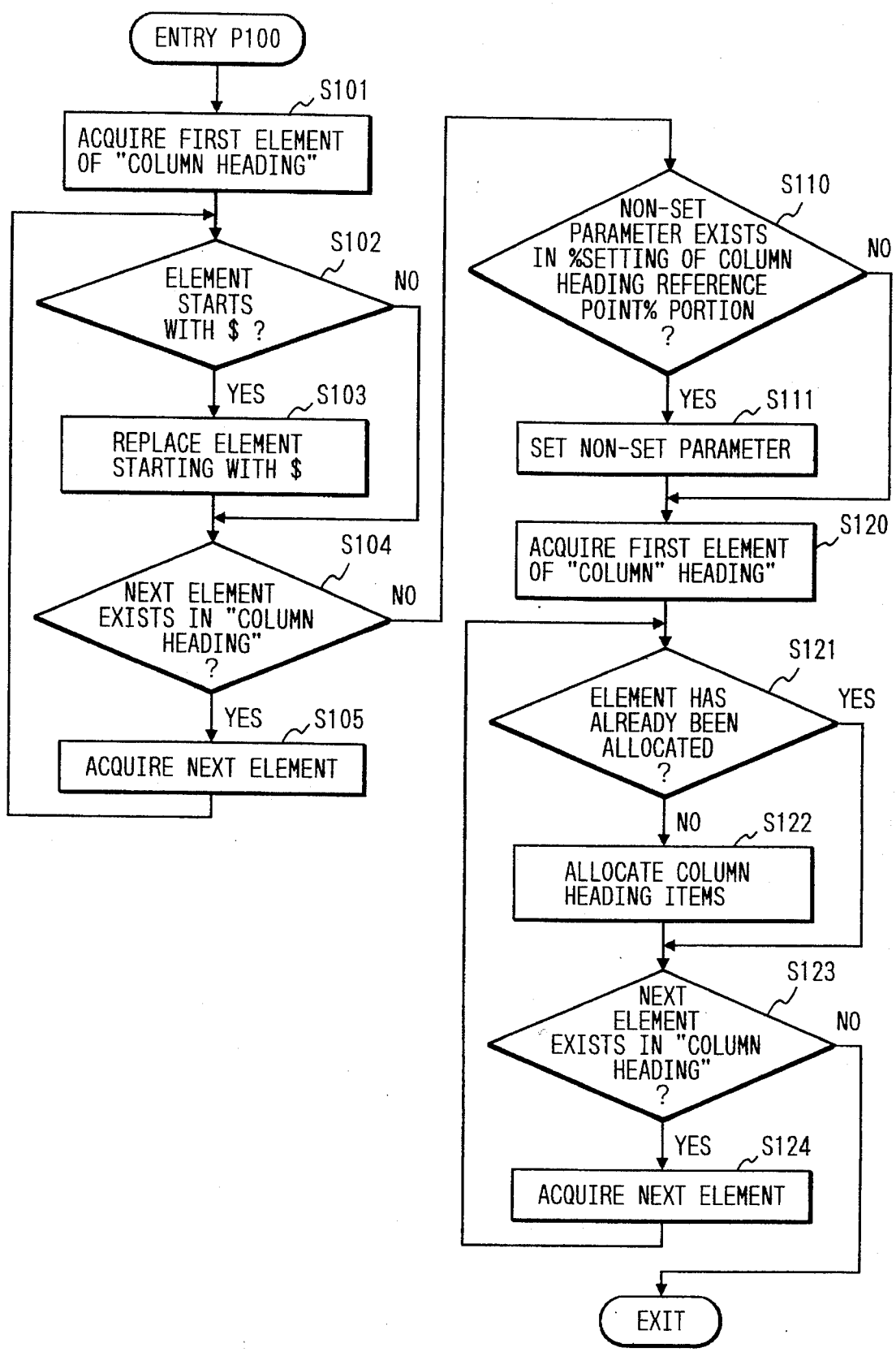

FIG. 16 is a flowchart showing the procedure P100 for the allocation of the column heading spaces. An element of a variable "column heading" of the table generating means 14 consists of a control symbol "$" and an attribute name following it, or an attribute name itself. In the former case, data obtained from attributes of search results that are retained by the logical structure retaining means 11 is employed as a column heading item. In the latter case, attributes themselves are employed as column heading items. Data obtained from attributes of search results that are retained by the logical structure retaining means 11 becomes a data item of a table.

In the flowchart of FIG. 16, a loop from step 102 to step 105 serves to develop respective elements starting with "$" in the variable "column heading" to data obtained from attributes following "$". As a result, all the column heading items are registered in the variable "column heading". For example, if (number of tests, &reaction, number, percentage) are designated in the variable "column heading", the contents of the variable "column heading" is rewritten to (number of tests, positive, number, percentage). If ($class, $order) are designated in the variable "column heading", its contents are rewritten to (mammals, birds, dog, cat, crow, pigeon).

Step S101: The first element of the variable "column heading" is acquired. If a value is set in the parameter "column heading" in the information of a table form, its contents are copied to the variable "column heading". If no value is set in the parameter "column heading", a value has already been set in the variable "column heading" in step S2 of FIG. 15.

Step S102: It is judged whether the elements starts with "$". If the judgment is affirmative, the process goes to step S103. If the judgment is negative, the process goes to step S104.

Step S103: all the data obtained from the attributes following "$" are collected while search results retained by the logical structure retaining means 11 are referred to, and the element is replaced by a set of the data thus collected.

Step S104: It is judged whether there exists a next element in the variable "column heading". In this case, if the element was replaced by the item set in step S103, the "next element" means an item located after the items of replacement. If the judgment is affirmative, the process goes to step S105. If the judgment is negative, the process goes to step S110.

Step S105: The next element is acquired. The process returns to step 102 to perform processing for the next element.

Steps S110 and S111 serve to set an initial value of a variable "reference point". The variable "reference point" retains coordinates of the top-left corner of a heading item space under allocation, and has, as an initial value, coordinates of the top-left corner of a first-allocated column heading item space. The variable "reference point" is updated while a %reference point change . . . % portion in the table form upon every allocation of one heading item.

Step S110: It is judged whether there exists a non-set parameter in a %setting of column heading reference point% portion in the table form. If the judgment is affirmative, the process goes to step S111. If the judgment is negative, the process goes to step S120.

Step S111: The parameter designating means 15 is called, and a value of a variable of the table generating means 14 having the same name as the non-set parameter is set.

Steps S120–S124 serve to sequentially extract not-yet-allocated heading items from the variable "column heading" and allocate the extracted column heading items.

Step S120: The first element of the variable "column heading" is extracted.

Step S121: It is judged whether the elements has already been allocated. If the judgment is affirmative, the process goes to step S123. If the judgment is negative, the process goes to step S122.

Step S122: Column heading items are allocated. This processing is performed by executing a procedure P200. If there exist heading items that can be allocated en bloc, they are found out. The heading items that can be allocated en bloc are distributed to parent headings and child headings, and the positions and sizes of item spaces for element allocation are calculated. Then, ruled lines are drawn around the item spaces, and item contents of the elements are allocated to the item spaces.

Step S123: It is judged whether there exists the next element in the variable "column heading". If the judgment is affirmative, the process goes to step S124. If the judgment is negative, the processing of allocating column heading spaces is finished and the process returns to the main routine.

Step S124: The next element is extracted. The process returns to step S121 to perform processing for the next element.

Figure 17:
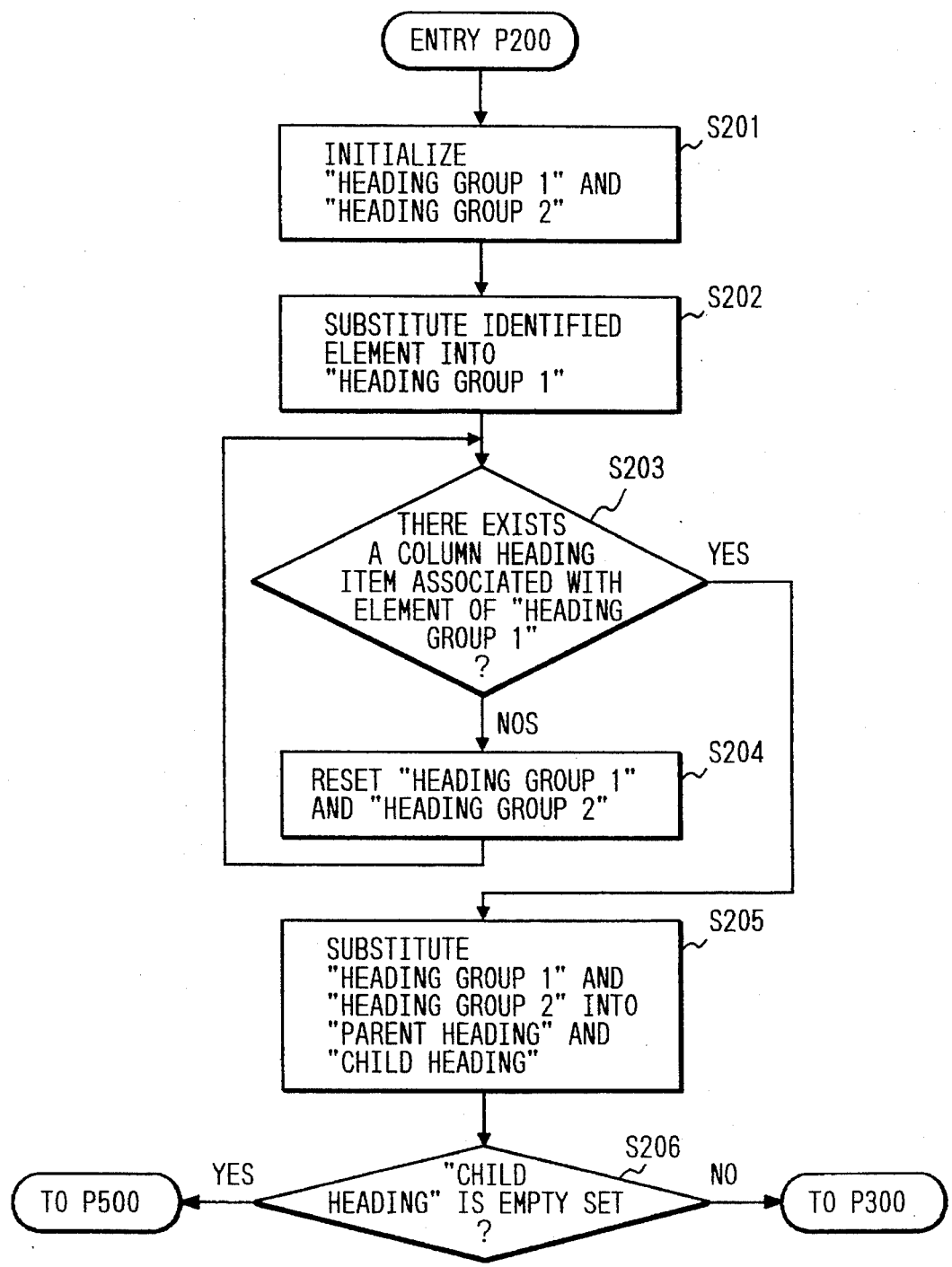

FIG. 17 is a flowchart showing a procedure P200 for allocating column heading items. First, it is judged whether the element identified in step S122, i.e., the column heading item is a parent heading item that is to be allocated to the first line, a child heading item that is to be allocated to the second line, or an isolated column heading item that is to be allocated so as to encompass the first and second lines. If the element is not an isolated column heading item, the element and column heading items that can be allocated together with the element are distributed to variables "parent heading" and "child heading". In this case, each of the variables "parent heading" and "child heading" retains at least one column heading item. If the element is an isolated column heading item, "parent heading" is a set having only that element and "child heading" is an empty set. Then, it is judged whether the element is an isolated column heading item based on whether "child heading" is empty, and a proper allocation procedure is called accordingly.

In FIG. 17, steps S201–S205 serve to sets of column heading items are substituted into the two variables "parent heading" and "child heading" The set of column heading items may be an empty set.

Step S201: Two temporary variables "heading group 1" and "heading group 2" are initialized into empty sets.

Step S202: The element identified in step S122 is entered into the variable "heading group 1".

Step S203: A column heading item associated with a certain element in the variable "heading group 1" is always subjected to a judgment of whether it belongs to "heading group 2". Two column heading items are "associated" if there exists a heading item string that includes the two column heading items and a correspondence from this heading item string to data is defined by a corresponding relationship between heading item strings and data retained by the logical structure retaining means 11. More precisely, two column heading items are associated if there exists a tuple that satisfies either of the following conditions in, for instance, search results with a relational data base. That is, both column heading items appear as items of a tuple, or one column heading item appears as an item of a tuple and the other is one of attributes for searching for the tuple. If a column heading item associated with a certain element of the variable "heading group 1" belongs to the variable "heading item 2" and all the related parent headings and child headings are allocated, or if there is no column heading item that is associated with an element of the variable "heading group 1", the process goes to step S205. If there exists a column heading item that is associated with a certain element of the variable "heading group 1" but does not belong to the variable "heading group 2", the process goes to step S204.

Step S204: All the heading items associated with a certain element of the variable "heading group 1" are collected and newly made the variable "heading group 2". Then, all the column heading items associated with a certain element of the variable "heading group 2" are collected and newly made the variable "heading group 1". Then, the process returns to step S203 to perform the judgment again.

Step S205: If the variable "heading group 2" is not an empty set, the variable "heading group 1" or "heading group 2" whichever has fewer elements is substituted into the variable "parent heading" and the other one is substituted into the variable "child heading". If the variable "heading group 2" is an empty set, the variable "heading group 1" is substituted into the variable "parent heading" and the variable "child heading" is made an empty set.

Step S206: It is judged whether the variable "child heading" is an empty set. If the judgment is affirmative, in which case an element of the variable "parent heading" is an isolated column heading item, the process goes to a procedure P500 for allocating an isolated column heading item. If the variable "child heading" is not an empty set, in which case there exists a parent and child heading items, the process goes to a procedure P300 to allocate those heading items.

Figure 18:
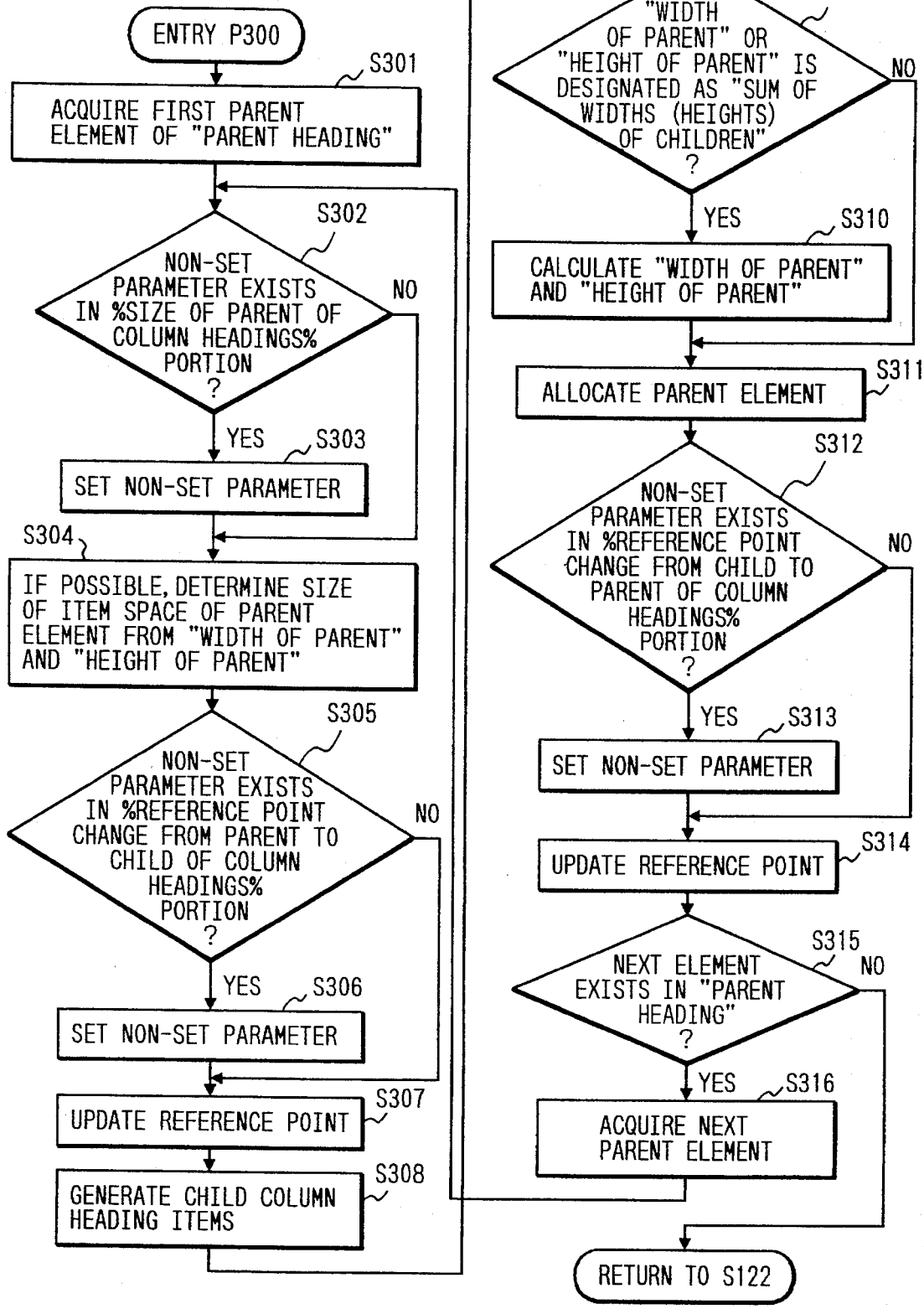

FIG. 18 is a flowchart showing the procedure P300 for allocating parent heading items, in which all the column heading items retained by the variables "parent heading" and "child heading" are allocated. Column heading items belonging to "parent heading" are allocated to the first line of the column heading item spaces, and column heading items belonging to "child heading" are allocated to the second line of those spaces.

Parent heading items are extracted one by one from the variable "parent heading" and allocated sequentially. Each parent heading item is allocated according to the following procedure. First, the size of the parent heading item is determined by referring to a %size of parent of column headings% portion in the table form. In this case, if, for example, "width of parent=sum of widths of children" is designated as a parameter, the width of the parent heading item is determined after all the child heading items to be located below the parent heading item space have been allocated. Then, child heading items to be located under the parent heading item are selected from the variable "child heading" and allocated. Ruled lines for the parent heading item space are drawn based on the above-determined size of the parent heading item space and the reference point, and a content of the parent heading item is allocated to the space. Finally, the reference point is updated to coordinates of the top-left corner of the next parent heading item space, to complete the processing of allocating one parent heading item.

Step S301: The first parent element of the variable "parent heading" is extracted. Coordinates of the top-left corner of the item space of the parent element are given by the variable "reference point". Therefore, once the size of the item space is determined, coordinates of the four corners of the space are determined to allow boundaries of the space to be drawn. Coordinates of the top-left corner of the item space of the first parent element are given by the parameter "reference point" in the table form.

Step S302: It is judged whether there exists a not-set parameter in the %size of parent of column headings% portion in the table form. If the judgment is affirmative, the process goes to step S303. If the judgment is negative, the process goes to step S304.

Step S303: The parameter designating means 15 is called, and a value of a variable of the table generating means 14 having the same name as the non-set parameter is set.

Step S304: If possible, the size of the item space of the parent element is determined while "width of parent" and "height of parent" are referred to. The size of the item space of the parent element means the size of the item space in which to write the content of the parent element as a column heading item. If "width of parent" and "height of parent" are designated as parameters in the table form, those values are used. If they are not set, the values of the variables having the same names that were set in step S303 are used. If "width of parent" and "height of parent" are set as, for instance, "sum of widths of children" in the table form retaining means 12, they are calculated after completion of the allocation of child heading items that depends on the parent heading item.

Step S305: It is judged whether there exists a non-set parameter in a %reference point change from parent to child of column headings% portion. If the judgment is affirmative, the process goes to step S306. If the judgment is negative, the process goes to step S307.

Step S306: The parameter designating means 15 is called, and a value of a variable of the table generating means 14 having the same name as the non-set parameter is set.

Step S307: The %reference point change from parent to child of column headings% portion in the table form is evaluated, and the value of the variable "reference point" is updated. The value of the variable "reference point" is coordinates of the top-left corner of a column heading item space for the next allocation, for instance, a child column heading item space. If the absolute value of "reference point" was designated in step S306, that value is employed as the updated value of the variable "reference point".

Step S308: all the elements of a variable "child column heading" that are associated with the parent element are allocated. This allocation processing is performed in a procedure P400.

Step S309: It is judged whether "width of parent" or "height of parent" is designated as "sum of widths (heights) of children". If the judgment is affirmative, the process goes to step S310. If the judgment is negative, the process goes to step S311 because the designation has already been done in step S304.

Step S310: "width of parent" and "height of parent" are calculated.

Step S311: The item content of the parent element is allocated, and ruled lines are drawn. The size and position of an item space to which the item content of the parent element, i.e., column heading item is to be allocated have been determined by the processing to step S310. The item content is allocated to the item space thus determined, and ruled lines are drawn around the item space.

Step S312: It is judged whether there exists a non-set parameter in a %reference point change from child to parent of column headings% portion. If the judgment is affirmative, the process goes to step S313. If the judgment is negative, the process goes to step S314.

Step S313: The parameter designating means 15 is called, and a value of a variable of the table generating means 14 having the same name as the non-set parameter is set.

Step S314: The %reference point change from child to parent of column headings% portion is evaluated, and the variable "reference point" is updated. The value of the variable "reference point" is coordinates of the top-left corner of a parent column heading item space or an isolated column heading space for the next allocation. If the absolute value of "reference point" was designated in step S313, that value is employed as the updated value of the variable "reference point". The processing for one parent column heading item is completed in this step.

Step S315: It is judged whether there exists a next parent element in the variable "parent heading". If the judgment is negative, the process returns to step S122. If the judgment is affirmative, the process goes to step S316.

Step S316: The next parent element is extracted, and the process returns to step S302 to generate the next parent heading item.

Figure 19:
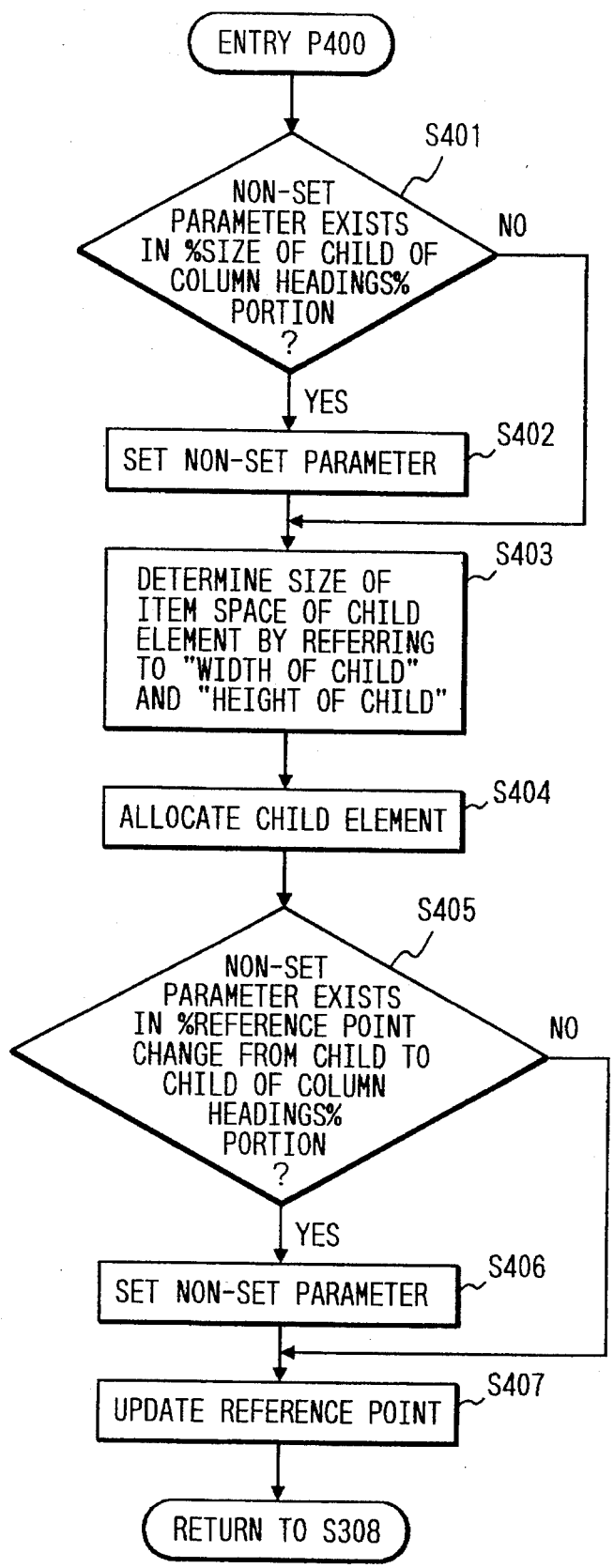

FIG. 19 is a flowchart showing a procedure P400 for allocating a child column heading item.

Step S401: It is judged whether there exists a non-set parameter in a %size of child of column headings% portion in the table form. If the judgment is affirmative, the process goes to step S402. If the judgment is negative, the process goes to step S403.

Step S402: The parameter designating means 15 is called, and a value of a variable of the table generating means 14 having the same name as the non-set parameter is set.

Step S403: The size of the item space of the child element is determined while "width of child" and "height of child" are referred to. The size of the item space of the child element means the size of the item space in which to write the content of the child element as a column heading item. If "width of child" and "height of child" are designated as parameters in the table form, those values are used. If they are not set, the values of the variables having the same names that were set in step S402 are used.

Step S404: The item content of the child element is allocated, and ruled lines are drawn. The size and position of an item space to which the item content of the child element, i.e., column heading item is to be allocated have been determined by the processing to step S403. The item content is allocated to the item space thus determined, and ruled lines are drawn around the item space.

Step S405: It is Judged whether there exists a non-set parameter in a %reference point change from child to child of column headings% portion in the table form. If the judgment is affirmative, the process goes to step S406. If the judgment is negative, the process goes to step S407.

Step S406: The parameter designating means 15 is called, and a value of a variable of the table generating means 14 having the same name as the non-set parameter is set.

Step S407: The %reference point change from child to child of column headings% portion is evaluated, and the value of the variable "reference point" is updated. The value of the variable "reference point" is coordinates of the top-left corner of a child column heading item space for the next allocation. If the absolute value of "reference point" was designated in step S406, that value is employed as the updated value of the variable "reference point". After the variable "reference point" is updated, the process returns to step S308.

Figure 20:
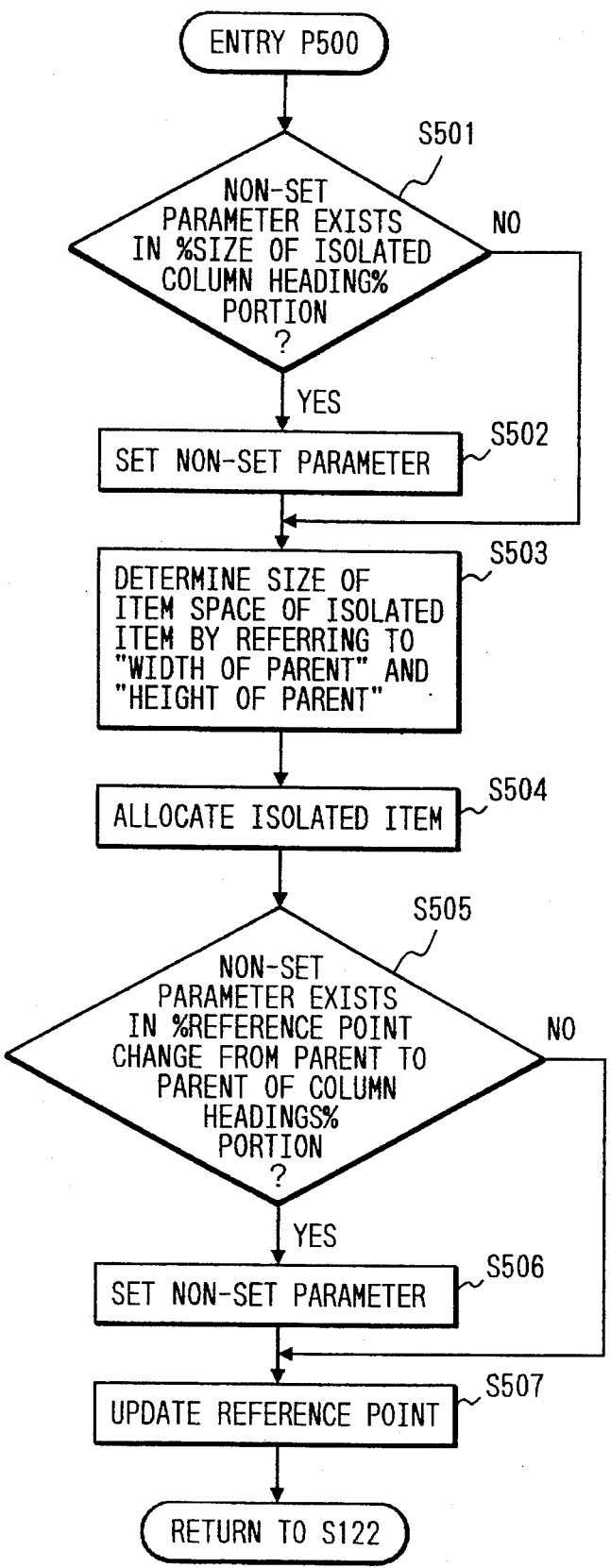

FIG. 20 is a flowchart showing a procedure P500 for allocating an isolated heading item. For convenience of description, an isolated heading item is sometimes mentioned as a "parent" element in the following description of the allocation of an isolated heading item.

Step S501: It is judged whether there exists a non-set parameter in a %size of isolated column heading" in the table form. If the judgment is affirmative, the process goes to step S502. If the judgment is negative, the process goes to step S503.

Step S502: The parameter designating means 15 is called, and a value of a variable of the table generating means 14 having the same name as the non-set parameter is set.

Step S503: The size of the item space is determined while "width of parent" and "height of parent" are referred to. If "width of parent" and "height of parent" are designated as parameters in the table form, those values are used as the width and height of the isolated heading item, respectively. If they are not set, the values of the variables having the same names that were set in step S502 are used.

Step S504: The item content of the isolated element is allocated, and ruled lines are drawn. The size and position of an item space to which the item content of the isolated element, i.e., isolated column heading item is to be allocated have been determined by the processing to step S503. The item content is allocated to the item space thus determined, and ruled lines are drawn around the item space.

Step S505: It is judged whether there exists a non-set parameter in a %reference point change from parent to parent of column headings% portion in the table form. If the judgment is affirmative, the process goes to step S506. If the judgment is negative, the process goes to step S507.

Step S506: The parameter designating means 15 is called, and a value of a variable of the table generating means 14 having the same name as the non-set parameter is set.

Step S507: The %reference point change from parent to parent of column headings% portion is evaluated, and the value of the variable "reference point" is updated. The value of the variable "reference point" is coordinates of the top-left corner of a parent column heading item space or isolated column heading item space for the next allocation. If the absolute value of "reference point" was designated in step S506, that value is employed as the updated value of the variable "reference point". After the variable "reference point" is updated, the process returns to step S122.

Figure 21:
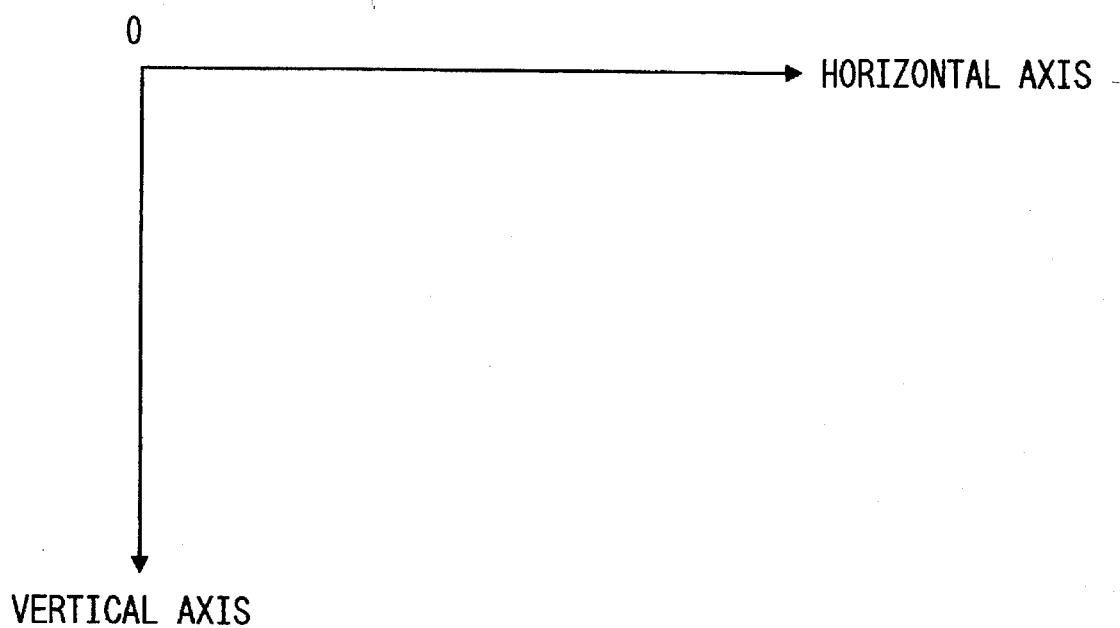
FIGS. 21–29 illustrate a process of generating a specific table.

The table generating apparatus according to this embodiment will further be described by using a specific example shown in FIGS. 21–29 with reference to the flowcharts of FIGS. 15–20. FIGS. 21–29 illustrate a specific example of a process of generating a standard table (see FIG. 29) based on the search results with a relational data base shown in FIGS. 13(A)–13(C). It is assumed that a standard table form shown in FIG. 32 is selected from the parameters indicating table forms retained by the table form retaining means 12, and that an orthogonal coordinate space as shown in FIG. 21 is employed for the table allocation.

First, in step S1 of FIG. 15, a %preamble% portion in the table form is referred to, and the value of a parameter having the same name as the referenced parameter is determined.

Then it is judged whether there exist non-set parameters. In the table form information shown in FIG. 32, no formula is provided for each of "row heading", "column heading", "height of column heading space", "width of row heading space", "height of parent of column headings" and "width of parent of row headings". Therefore, in step S2, a user designates values of those parameters with the parameter designating means 15. For example, "column heading" and "row heading" are designated by distributing to those the attributes that were used in the search. In FIG. 29, "number of tests", "number" and "percentage", which attributes were used in the search with a data base, are used as column heading item names. Other heading items "mammals", "birds", "dog", "cat", "crow", "pigeon" and "positive" are data that were obtained from the attributes "class", "order" and "reaction". Like this case, when it is attempted to generate a table based on search results with a relational data base, not only attributes but also data obtained from the attributes become heading items when data obtained from an attribute become heading items, a symbol "$" is used before an attribute name so that this is differentiated from the case where an attribute itself becomes a heading item. For example, since two data "mammals" and "birds" are obtained from "class", "mammals" and "birds" are employed as heading items by making a designation "$class". In this example, (number of tests, $reaction, number, percentage) are designated for the parameter "column heading", and ($class, $order) are designated for the parameter "row heading". The other parameters are designated with the parameter designating means 15. It is assumed here that the following designations were made.

column heading=(number of tests $reaction number percentage)

column heading=($class $order)

height of column heading space=10 width of row heading space=10 height of parent of row headings=5 width of parent of column headings=5

Next, in step S3, column heading items are allocated to column heading spaces. In steps S101–S105 of FIG. 16, each element starting with $ appearing "column heading" is replaced by a list of items belonging to an attribute following $. In this case, a list consisting of only items appearing in the search results retained by the logical structure retaining means 11 is allowed to be substituted for an element. For example, since there exist two items of "mammals" and "birds" that appear in the search result and belong to the attribute "class", "$class" is replaced by "mammals birds". As for "column heading", "$reaction" is replaced by "positive" to produce the following replacement result.

column heading=(number of tests positive number percentage)

Figure 22:
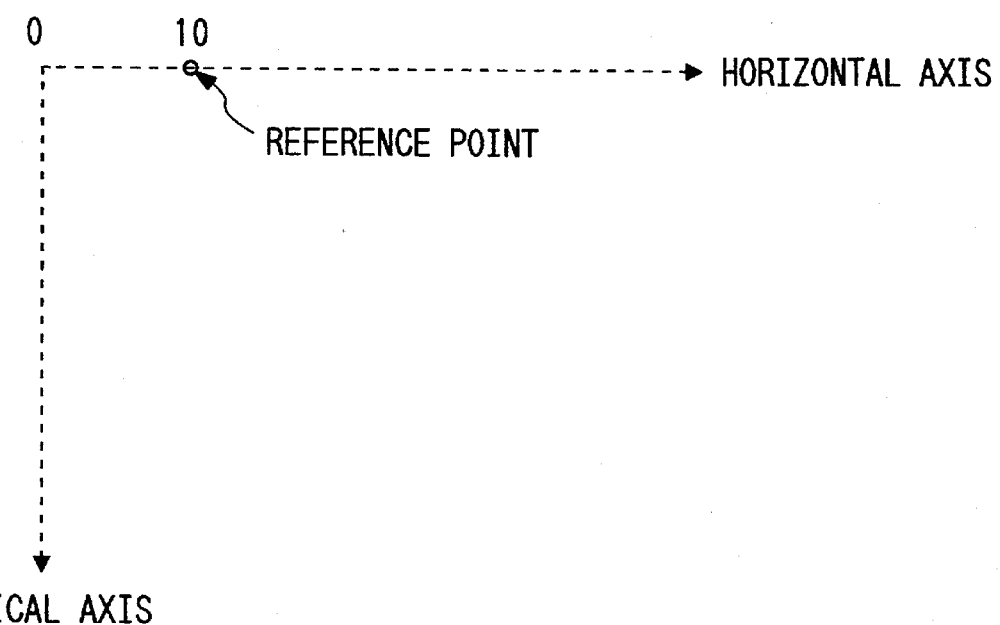

In step S111 of FIG. 16, a %setting of column heading reference point% portion is referred to. Since there is a description (width of row heading space, 0) in the table form of FIG. 32, reference point=(10, 0)

is retained by a value retaining section of the table generating means 14 by referring to "width of row heading space". FIG. 22 shows this state.

In step S120 of FIG. 16, the first element "number of tests" of "cole heading" is extracted. In step S121, it is judged that the column heading item "number of tests" has not been allocated yet. In step S122, the procedure P200 for allocating "number of tests" is executed.

In step S201 of FIG. 17, "heading group 1" and "heading group 2" are initialized. In step S202, "number of tests" is entered into "heading group 1". In step S203, a column heading item associated with "number of tests" is searched for. Since such a column heading item not found, the process goes to step S205. In step S205, since the set to be entered into "heading group 2" remains an empty space, "number of tests" of "heading group 1" is made "parent heading". "Child heading" is an empty set. In step S206, since "child heading" is an empty set, the procedure P500 for allocating an isolated column heading item is executed.

In steps S501–S503 of FIG. 20, the "%size of isolated column heading% portion in the table form of FIG. 32 is referred to. Since no formula of "width of isolated column heading", i.e., "width of parent" is described, width of parent=10 is input using the parameter designating means 15. Since there is a description "height of parent=height of column heading space" in the table form, the already set value of "height of column heading space" is used for "height of isolated column heading". That is, a designation of height of isolated column heading=10 is made.

In step S504 of FIG. 20, a rectangular frame having a width 10 and a height 10, which are determined by "width of parent" and "height of parent", i.e., "width of isolated column heading" and "height of isolated column heading", is generated with the reference point position (10, 0) as its top-left corner, and "number of tests" is inserted into the rectangular frame thus generated.

In steps S505–S507, a %reference point change from parent to parent of column headings% portion in the table form is referred to, and the reference point is changed. Based on the parameter shown in FIG. 32, the following calculation is made:

reference point + (width of parent, 0)
= (10, 0) + (10, 0)
= (20, 0).

Figure 23:
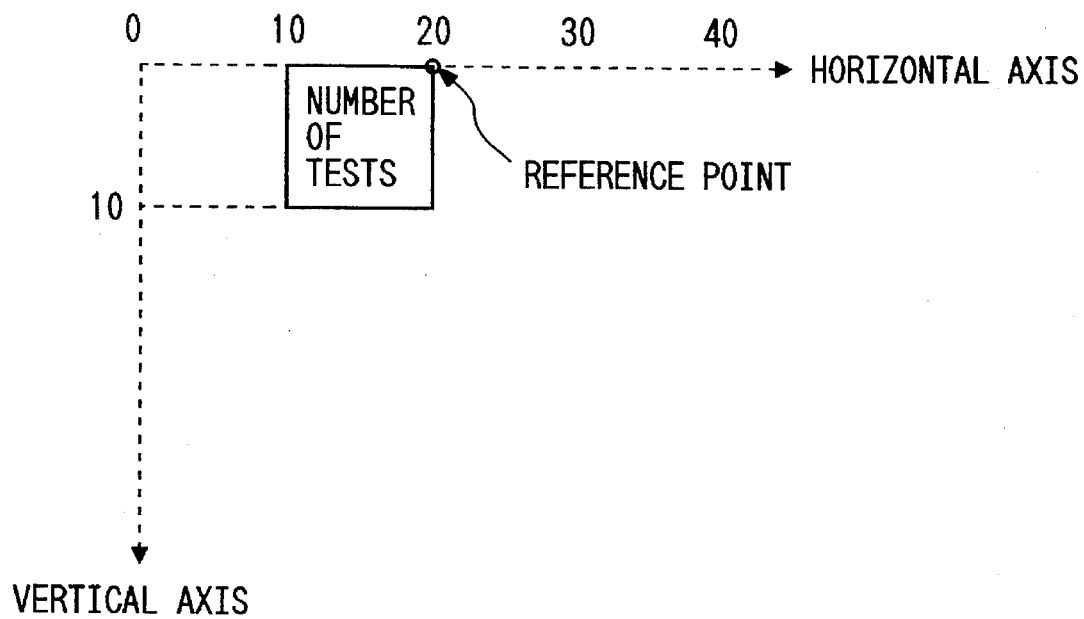

Thus, the new reference point has coordinates (20, 0). FIG. 23 shows a state in which the column heading "number of tests" has been generated and the reference point has been changed.

Reference is made again to FIG. 16. The next element "positive" of "column heading" is extracted in step S124, and the procedure P200 is executed in step S122 to allocate "positive". In step S202, "positive" is entered into "heading group 1". In step S203, there exist the items "number" and "percentage" that are associated with "positive". Therefore, in step S204, those two items are entered into "heading group 2". In step S205, since "heading group 2" is not an empty set and the numbers of items of "heading group 1" and "heading group 2" are 1 and 2, respectively, "heading group 1" is entered into "parent heading" and "heading item 2" is entered into child heading". In step S206, "child heading" is not an empty set. Therefore, the procedure P300 is executed to allocate "parent heading" and "child heading".

In step S301 of FIG. 18, the element "positive" is extracted from "parent heading". In step S302, by referring to a %size of parent of column headings% portion in the table form of FIG. 32, the value is calculated as follows:

height of parent = height of parent of column headings
= 5.

Since "width of parent" is "sum of widths of children", the processing to display parent heading item is suspended to transfer to the processing to display the child heading items.

This is so because the width of the item space of the parent heading item "positive" cannot be determined until determination of the widths of the item spaces of the child heading items "number" and "percentage".

In steps S305–S307 of FIG. 18, first the reference point for the allocation of the child heading item is calculated. By referring to a %reference point change from parent to child of column headings% portion in the table form of FIG. 32, the reference point is calculated as follows:

$$\text{reference point} + (0, \text{height of parent})$$
$$= (20, 0) + (0, 5)$$
$$= (20, 5).$$

Figure 24:
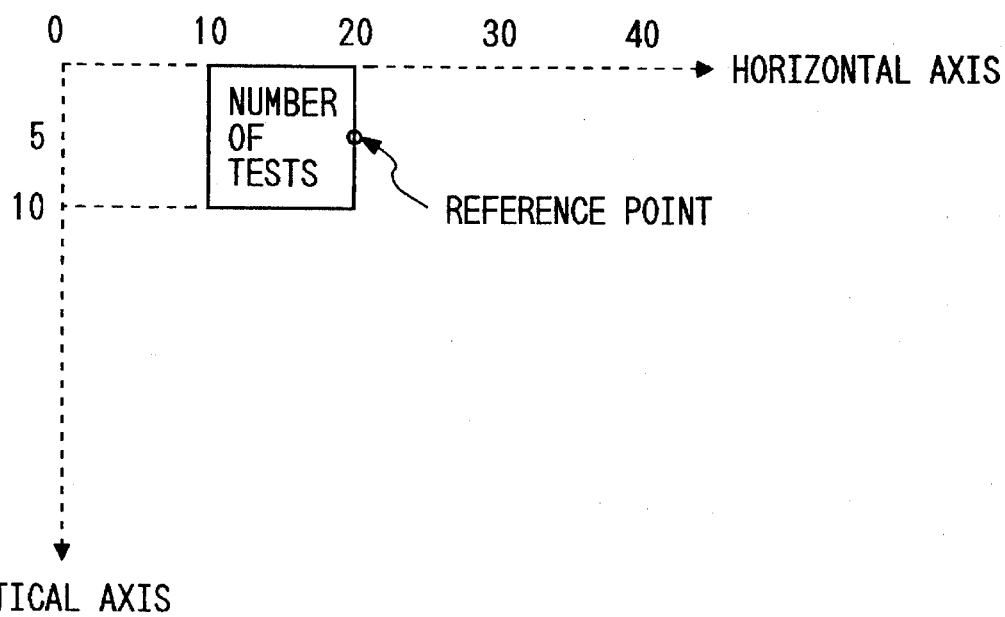

FIG. 24 shows this state.

Next, in step S308 of FIG. 18, the child heading item is allocated. In step S401 of FIG. 19, a %size of child of column headings% portion in the table form of FIG. 32 is referred to. Since "width of child" is not designated, in step S402 a value is input with the parameter designating means 15 such that width of child=10.

According to a description in the table form, "height of child" is calculated such that $$\begin{aligned}\text{height of child} &= \text{height of column heading space} - \text{height of parent}\\ &= 10 - 5\\ &= 5.\end{aligned}$$

In step S403, the size of the item space of the child heading is determined from "width of child" and "height of child". In step S404, a rectangle having a width 10 and a height 5 is generated with the reference point (20, 5) as its top-left corner, and "number" is inserted into the rectangle thus generated. Thus, the child heading "number" is generated. In steps S405–S407, a %reference point change from child to sibling of column headings% portion in the table form is referred to, and the reference point is changed as follows:

reference point+(width of child, 0)

$$\text{reference point} + (\text{width of child}, 0)$$
$$= (20, 0) + (10, 0)$$
$$= (30, 5).$$

Figure 25:
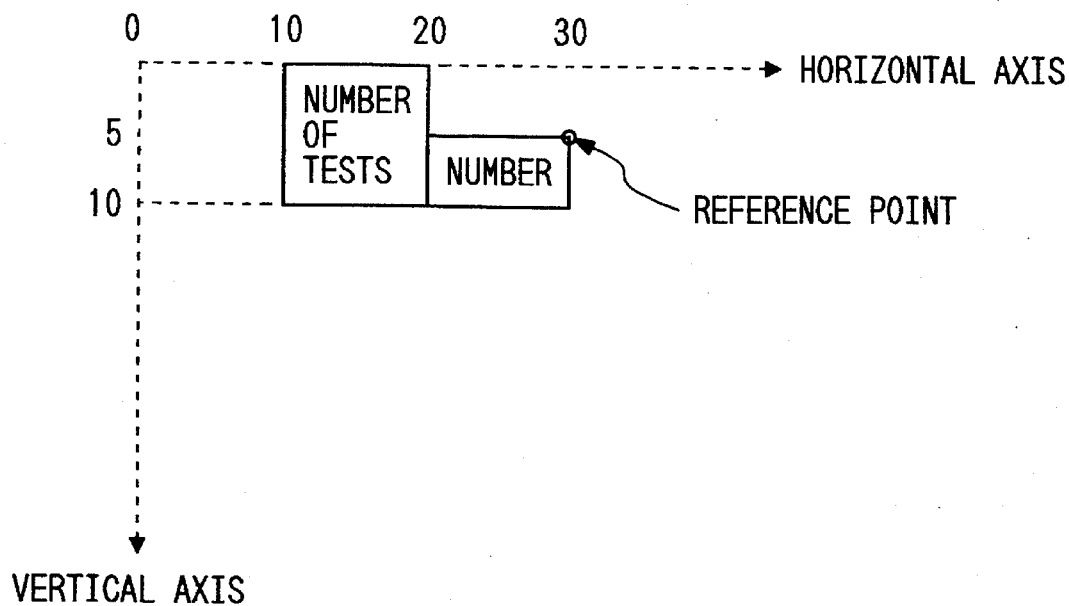

FIG. 25 shows this state.

The process returns to step S308 of FIG. 18. Since there still exists the child heading item "percentage", the procedure P400 for the child heading allocation is executed. In step S401 of FIG. 19, the %size of child of column headings% portion in the table form of FIG. 32 is referred to. Since "width of child" is not designated, in step S402 a value is input with the parameter designating means 15 such that width of child=10.

According to a description in the table form, "height of child" is calculated such that $$\begin{aligned}\text{height of child} &= \text{height of column heading space} - \text{height of parent}\\ &= 10 - 5\\ &= 5.\end{aligned}$$

In step S403, the size of the item space of the child heading is determined from "width of child" and "height of child". In step S404, a rectangle having a width 10 and a height 5 is generated with the reference point (30, 5) as its top-left corner, and "percentage" is inserted into the rectangle thus generated. Thus, the child heading "percentage" is generated. In steps S405–S407, the %reference point change from child to sibling of column headings% portion in the table form is referred to, and the reference point is changed as follows:

$$\text{reference point} + (\text{width of child}, 0)$$
$$= (30, 0) + (10, 0)$$
$$= (40, 5).$$

Figure 26:
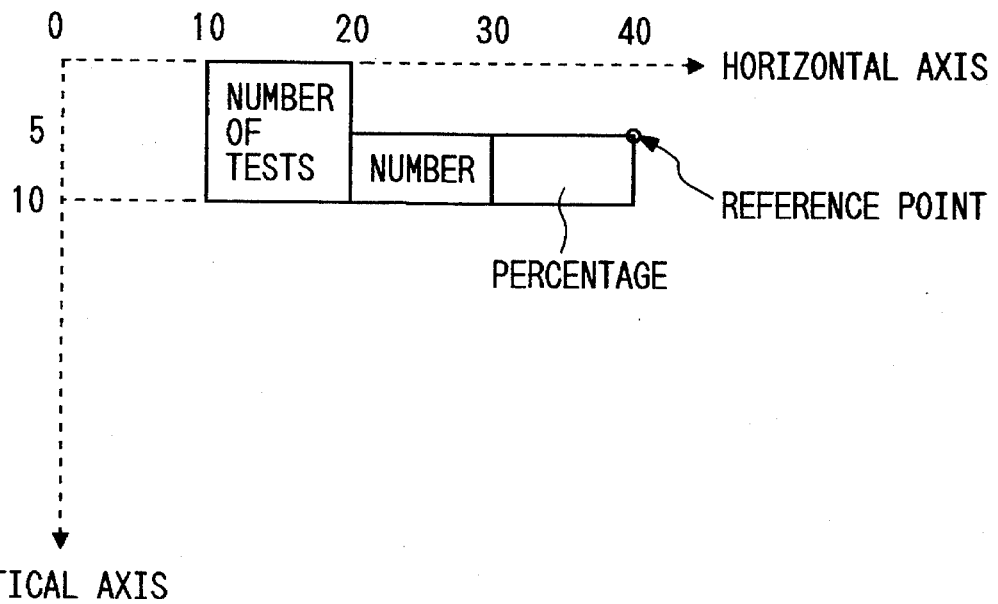
Figure 27:
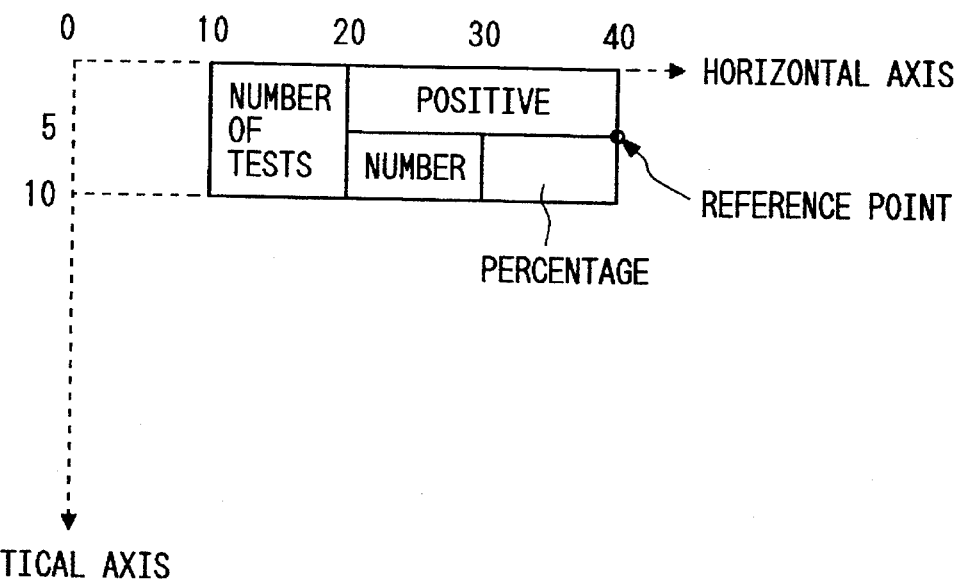

FIG. 26 shows this state.

The process returns to step S308 of FIG. 18. Since all the child heading items have been generated, the process goes to the following step. In steps S309 and S310, "width of parent" is calculated. It is recalled that in step S304 the calculation was suspended because the parameter "width of parent" was designated as "sum of widths of children" in the %size of parent of column headings% portion in the table form of FIG. 32. The "width of parent" is now calculated such that $$\begin{aligned}\text{width of parent} &= \text{sum of widths of children}\\ &= 10 + 10\\ &= 20.\end{aligned}$$

"Height of parent" is 5 as calculated in step S304. Therefore, in step S311, a rectangle having a width 20 and a height 5 is generated with its top-left corner having coordinates (20, 0), and "positive" is inserted into the rectangle thus generated. In the above manner, the heading items "positive", "number" and "percentage" are allocated en bloc.

In steps S312 and S314, a %reference point change from child to parent of column headings% portion in the table form of FIG. 32 is referred to, and the reference point is updated by making the following calculation:

$$\text{reference point} + (0, -\text{height of parent})$$
$$= (40, 5) + (0, -5)$$
$$= (40, 0).$$

Since all the column heading items have been allocated, the process returns to step S122 of FIG. 16, and then returns to step S3 of FIG. 15. The process goes to step S4 for the column heading generation. The row heading items are generated in the same manner as the column heading items were generated above. The row heading items to be generated are designated in step S2 such that row heading=($class $order).

Therefore, data obtained from the attribute "class" are allocated as row parent heading items, and data obtained from the attribute "order" are allocated as row child heading items. That is, "$class" and "$order" are developed to produce row heading=(mammals birds dog cat crow pigeon).

Figure 28:
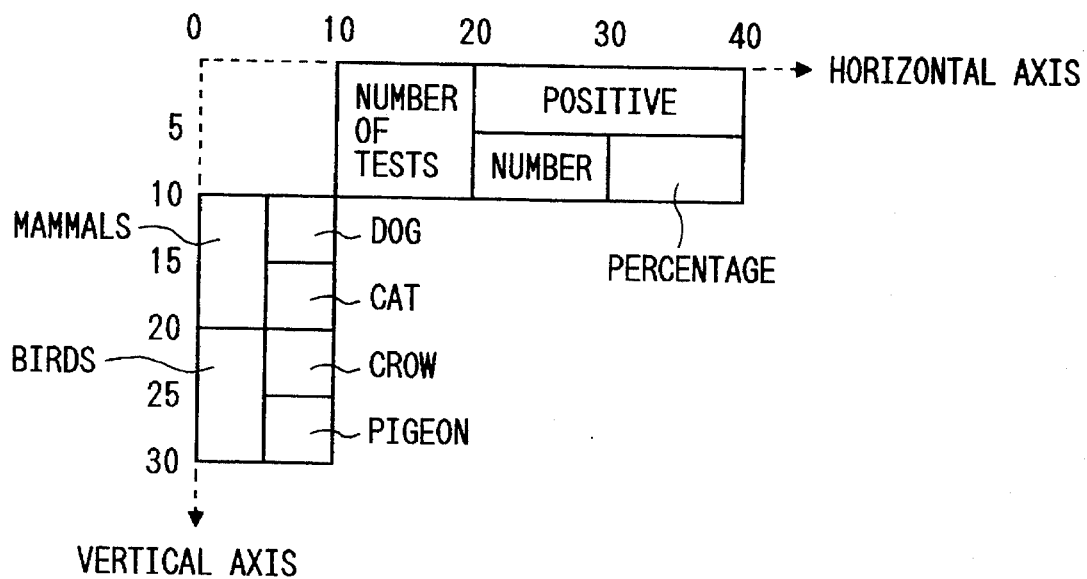

Vertically arranged child heading blocks "dog" and "cat" are placed on the right side of a parent heading block "mammals", and vertically arranged child headings "crow" and "pigeon" are placed on the right side of a parent heading block "birds". FIG. 28 shows the state in which the row heading items have been generated.

After the generation of the row heading items and column heading items, in step S5, while the corresponding relationship between the heading item strings and table data retained by the logical structure retaining means 11, the positions and sizes of the item spaces into which to insert the table data are calculated, rectangles are drawn around the item spaces, and the data item contents are inserted into the respective rectangles thus drawn. In an irregular table, it is permitted that a data item space encompasses a plurality of rows or columns. The table shown in FIG. 29 is finally obtained by the above-described processing.

Although in the above embodiment a user designates non-set parameters in a table form using the parameter designating means 15, it is possible to generate a table automatically without involvement of a human by preparing a list of values of non-set parameters or a table form itself in the form of a file that is attached to the file of the corresponding relationship between the heading information and data retained by the logical structure retaining means 11. By designating several sets of those files, a number of tables can be generated consecutively.

According to the embodiment described above, a table can be generated automatically based on the heading information and table data retained by the logical structure retaining means and the parameters retained by the table form retaining means. Since the table form can be changed easily by the selection from the parameters or the designation of parameters, a table can be given a form that is suited to preferences of a user, a purpose of the table, etc. A table form can be modified without re-generating a table from the start.

The heading information, table data, etc. retained by the logical structure retaining means is stored in the form of a file or the like and read out when necessary, and a desired table form is selected from table forms retained by the table form retaining means. This constitution improves the reusability of a table and increases the efficiency of table generation. Tables can be shared by a plurality of users by enabling them to share the above data. A table can be displayed in an optimum form by selecting a table form in accordance with preferences of a user and a purpose of the table.

By using search results with a data base as data to be retained by the logical structure retaining means, it becomes possible to almost automatically generate a table in a form that is most suitable for each document. That is, automatic table generation with the use of a data base can be realized.

Since, as described above, a table can be generated automatically in a form that is most suitable for its purpose by simply selecting a table form, routine office works can be automated. That is, in terms of office automation, automatic processing of a document including tables can be performed while high document quality is maintained.

What is claimed is:

1. A table generating apparatus comprising:

logical structure retaining means for retaining a correspondence between heading information which is a set of headings of a table and table data representing a content of the table;

table form retaining means for retaining parameters which determine a layout form of the table, including a heading parameter which specifies a set of headings to be laid out in the table;

table generating means for generating a layout of the table comprising:

heading structure determining means for determining a structure of headings of the table by judging whether any subset of the set of headings specified by the heading parameter corresponds to the table data in accordance with the correspondence retained by said logical structure retaining means and the heading parameter retained by said table form retaining means;

heading layout means for generating a layout of the headings specified by the heading parameter in accordance with the structure of headings and the parameters retained by said table form retaining means, and table data allocating means for allocating the table data in accordance with the correspondence retained by the logical structure retaining means, the parameters retained by said table form retaining means, and the layout of the headings.

2. The table generating apparatus described in claim 1, wherein said heading structure determining means determines a parent-child structure by judging whether each pair of the set of the headings specified by the heading parameter corresponds to the table data in accordance with the correspondence retained by said logical structure retaining means.

3. The table generating apparatus described in claim 2, wherein said heading structure determining means generates two heading groups from the set of headings specified by said heading parameter so that every pair of a heading belonging to one of the heading group and a heading belonging to another heading group corresponds to the table data, and one of the two heading groups which has fewer elements is set as to the parent heading and another is set to the child heading.

4. The table generating apparatus described in claim 1, wherein said table form retaining means further comprises a rule which determines a value of the parameters; and said table generating means generates the layout of the table in accordance with the value of the parameter by the rule.

5. The table generating apparatus described in claim 1, wherein said logical structure retaining means further retains, as a pair, a group of headings and a distinguishable name of the group; and said table form retaining means retains the distinguishable name of the group as a value of parameter.

6. The table generating apparatus described in claim 1, further comprising parameter designating means for designating a value of the parameters retained by said table form retaining means.

* * * * *